United States Patent [19]

Ishizaki

[11] Patent Number: 5,720,172

[45] Date of Patent: Feb. 24, 1998

[54] REGENERATIVE TYPE ENGINE WITH FLUID CONTROL MECHANISM

[75] Inventor: Yoshihiro Ishizaki, Kamakura, Japan

[73] Assignees: Aisin Seiki Kabushiki Kaisha, Kariya; Ecti Kabushiki Kaisha, Kamakura, both of Japan

[21] Appl. No.: 741,363

[22] Filed: Oct. 30, 1996

[30] Foreign Application Priority Data

Oct. 31, 1995 [JP] Japan ................................. 7-283985
Jul. 22, 1996 [JP] Japan ................................. 8-192480

[51] Int. Cl.$^6$ ............................................... F25B 9/00
[52] U.S. Cl. ............................................... 62/6; 60/517
[58] Field of Search ............................... 62/6; 60/517

[56] References Cited

U.S. PATENT DOCUMENTS

| | | | |
|---|---|---|---|
| 5,269,147 | 12/1993 | Ishizaki et al. | 62/6 |
| 5,275,002 | 1/1994 | Inoue et al. | 62/6 |
| 5,335,505 | 8/1994 | Ohtani et al. | 62/6 |
| 5,481,878 | 1/1996 | Shaowei | 62/6 |
| 5,522,223 | 6/1996 | Yanai et al. | 62/6 |

*Primary Examiner*—Christopher Kilner
*Attorney, Agent, or Firm*—Burns, Doane, Swecker & Mathis, LLP

[57] ABSTRACT

A regenerative type engine which improves efficiency is provided. The regenerative type engine with fluid control mechanism comprises a radiator arranged in a position which is at least one of between the pressure fluctuation source and a regenerator and between a cold head and a phase regulating mechanism, and a flow path controller connected to the radiator, for independently regulating the flow path in the forward process and the flow path in the backward process of the operating fluid within the system of the regenerative type engine, the flow path controller independently regulating the flow path in the forward process and the flow path in the backward process such that the flow path in the forward process passes through the radiator and the flow path in the backward process bypasses the radiator.

18 Claims, 11 Drawing Sheets

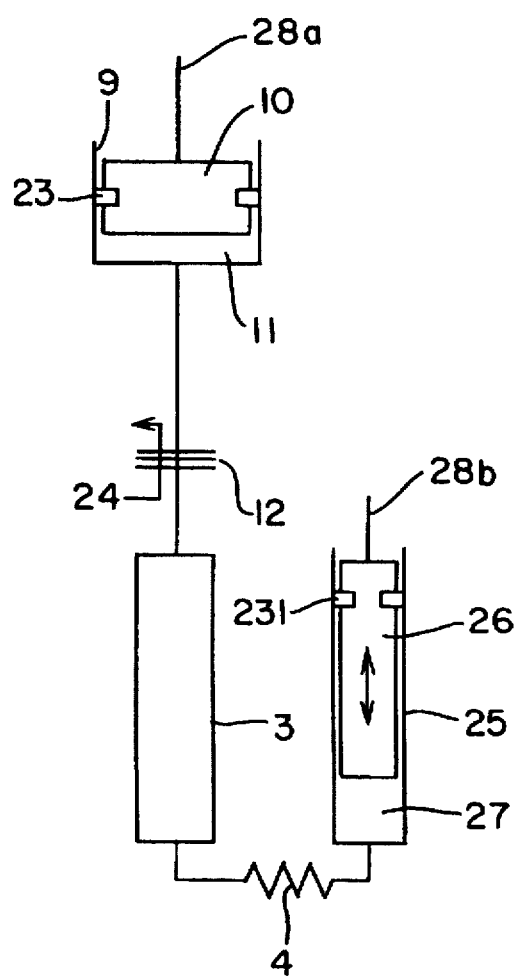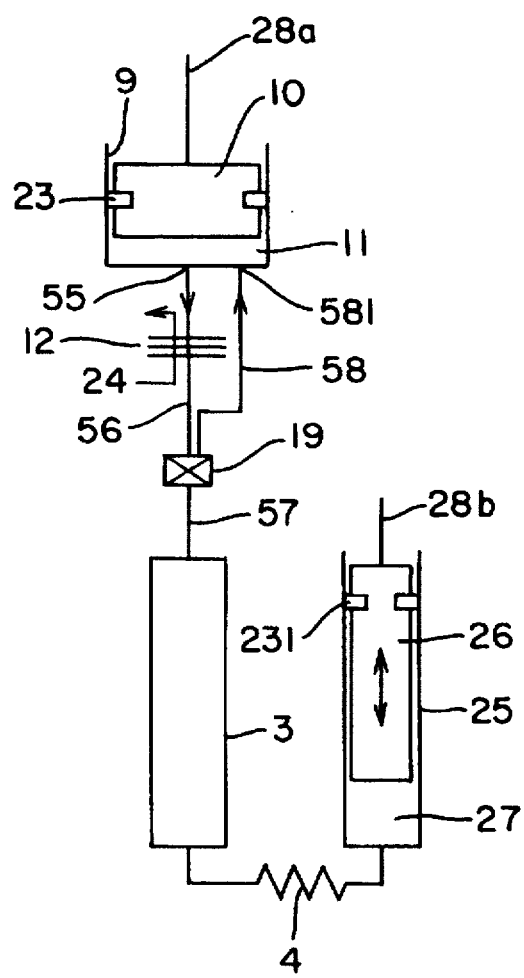

REGENERATIVE TYPE ENGINE WITH FLUID CONTROL MECHANISM

BACKGROUND OF THE INVENTION

The present invention relates to a fluid controller for controlling the flow rate or direction of flow of a fluid, and more particulary to a regenerative type engine with a fluid controller for controlling an operating fluid in the regenerative type engine.

A pulse tube refrigerator (hereinafter referred to as the existing system) was first proposed by W. Gifford et al. in 1963. Low temperature generation by this existing system has based its operating principle on the characteristic of non-equilibrium state of fluid, so that it has been extremely difficult to grasp the actual operating stage and analyze it by introducing an equation therefrom. Further, the low temperature as generated has not been very low and the efficiency has also been low. Recently, various types have been proposed, so that a type which can achieve 23 K absolute temperature with a single stage regenerator system which is the lowest arrival temperature has appeared and an efficiency has been improved.

Block diagrams of the flow path and machinery of an existing typical pulse tube refrigerator are shown in FIGS. 1(a), (b), (c) and (d), and a stirling engine is shown in FIG. 2(a). Since an explanation of the principle relating to low temperature generation and power generation in the heat cycles of these has already been given in many previous publications, a detailed explanation thereof is omitted herein.

FIG. 1(a) is a flow path diagram of a pulse tube refrigerator known as a double inlet system, wherein a normal temperature fluid from a compressor 1 is introduced from an inlet valve 2a into and cooled in a regenerator 3 which is packed with a mesh of bronze, stainless, etc. or an indeterminate number of spherical bodies having high magnetic specific heat, passes through a cold head 4 formed between a low temperature end 3a of the regenerator 3 and a low temperature end 5a of a pulse tube 5 so as to cool a coolant, has its temperature reduced further by adiabatic expansion by means of the pulse tube 5 which is made of a metal, ceramic or plastic material, passes through a valve 6 such as a needle valve, orifice or the like which adjusts the pressure, flow rate and flow speed of the fluid, whose temperature is gradually rising, and enters a fluid pool (also known as a buffer tank) 7 which has substantially the same function as the valve 6, adjusts the flow rate, speed and pressure of the fluid within the flow path system, and lowers the temperature of the fluid to a normal temperature by heat radiation (although the temperature of part of the fluid rises, this is naturally cooled by a connecting pipe between a high temperature end portion of the pulse tube 5 and the fluid pool 7, and by the fluid pool 7 itself). Next, upon opening of a discharge valve 2b, the fluid in the fluid pool 7 passes through a valve 6 and although part of the fluid returns from the high temperature end 5b of the pulse tube 5 through a valve 8 to the high temperature end 3b of the regenerator 3 and the discharge valve 2b, most of the fluid is subjected to a temperature drop within the pulse tube 5, cools the coolant in the cold head 4 between the low temperature end 3a of the regenerator 3 and the low temperature end 5a of the pulse tube 5, enters the regenerator 3 to be subjected to a rise in temperature and returns to the compressor 1 from the discharge valve 2b, thus completing one cycle.

Consequently, in the case of FIG. 1(a), devices which function as a pressure fluctuation source for fluctuating the pressure are the compressor 1, the inlet valve 2a and the discharge valve 2b.

It is noted that a guide tube 17 is known as a double inlet passage. The double inlet passage 17 is connected to the high temperature end portion 3b of the regenerator 3 and the high temperature end portion 5b of the pulse tube 5 via the valve 8 which is provided midway through the double inlet passage 17 and has the structure of a needle valve, orifice or the like, and as well as bypassing the fluid and performing adjustment of the pressure and flow rate within the system, also introduces from the pulse tube 5 side a normal temperature fluid from the regenerator high temperature end portion 3b, mixes it with a fluid of relatively high temperature, prevents a rise in temperature in the vicinity of the valve 6, and has the function, together with the valve 6, of adjusting the flow speed of fluid in the process of returning to the discharge valve 2b from the fluid pool 7. Therefore, in a single orifice type pulse tube refrigerator without a double inlet passage, although the fluid pool 7 and the valve 6 control the flow speed etc. of fluid within the system and regulate pressure fluctuation of the operating fluid and phase differences in displacement fluctuation to fulfill the role of a phase regulating mechanism, in a double inlet type pulse tube refrigerator, a phase regulating mechanism is added to the fluid pool 7 and the valve 6 and the double inlet passage 17 and valve 8 function as a second phase regulating mechanism. Accordingly, the double inlet type pulse tube refrigerator has a wider fluid control range than the single orifice type pulse tube refrigerator, and because it can operate in a state which is closer to optimum condition, it operates efficiently.

Note also that with respect to the inlet valve 2a and the discharge valve 2b, there are many cases where one rotary valve which is electrically, mechanically or fluid driven is utilized.

The fluid which has exited the pulse tube 5 is mixed in the high temperature end 5b of the pulse tube 5 with a normal temperature fluid which has bypassed the double inlet passage 17 by means of the valve 8 and has its temperature, flow rate, flow speed, pressure, etc. adjusted, but reaches a temperature which is relatively higher than the normal temperature in an operating frequency range of 2 to 4 Hz (approximately 330 K). These fluids are thereafter introduced into the fluid pool 7 from the valve 8 and naturally cooled.

Accordingly, when the fluid pool 7 is made compact and the operating frequency increased to increase relative output as a refrigerator, the radiating surface area of the fluid pool 7 decreases, the device reaches a high temperature and conversely a reduction in the cooling output is imposed by an increase in the intrusion of heat into the low temperature portion and reduction in the mass of the fluid.

FIG. 1(b) shows a piston type pulse tube refrigerator, which comprises a normal temperature cylinder 9, a compressing space 11 for repeating compression of the fluid by means of a piston 10 reciprocally driven by a crankshaft or linear engine not shown in the drawing, and a first radiator 12 for radiating fluid compression heat to a fluid path system 24 of a cooled fluid (air, a liquid such as water, a freezing mixture such as LNG etc.) of a substantially constant entrance temperature, the rest of the mechanical structure being the same as in FIG. 1(a). Note that reference numeral 23 is a piston ring and the piston type pulse tube refrigerator can easily generate a temperature of 77 K or less.

Note also that in FIG. 1(b) the pressure fluctuation source is formed by the piston 10, cylinder 9 and compression gap 11.

FIG. 1(c) is a diagram of the flow path and mechanical structure of a stirling cycle type pulse tube refrigerator. This comprises a compressing space 11, a normal temperature cylinder 14, and an expanding space 16 for repeating expansion of the fluid by means of an expansion piston 15 reciprocally driven by a crank shaft, linear engine or the like not shown in the drawing, and the compression piston 10 and expansion piston 15 are operated while maintaining a given phase difference. Between the compressing space 11 and expanding space 16 a low temperature is generated by means of the structure which connects the first radiator 12, the regenerator 3, the cold head 4, the pulse tube 5, a second radiator 13 and the valve 6.

Note that in FIG. 1(c), the pressure fluctuation source is formed by the piston 10, cylinder 9 and compression gap 11 similarly to FIG. 1(b), and the phase regulating mechanism is formed by the piston 15, cylinder 14 and expansion gap 16.

FIG. 1(d) is a structure which connects the high temperature end portion 3b of the regenerator 3 and the high temperature end 5b of the pulse tube 5 to the structure of FIG. 1(c) via the valve 8, causing the fluid to bypass the regenerator 3, the cold head 4 and the pulse tube 5.

In FIG. 1(d), although the pressure fluctuation source is formed by the piston 10, cylinder 9 and compression gap 11 and the phase regulating mechanism is formed by the piston 15, cylinder 14 and expansion gap 16, a double inlet passage 17 and the valve 8 are added as a second phase regulating mechanism.

FIG. 2(a) shows the flow path system of an existing Stirling engine which is a well-known regenerative type engine and has extremely high efficiency in the case of both refrigerators and prime movers.

A first radiator 12, regenerator 3 and cold head 4 are connected between a fluid compressing space 11 and an expansion space 27 which is formed by a relatively long cylinder 25 and an expansion piston (or a displacer) 26 within the cylinder 25, which reciprocate via a piston rod 28b by means of a linear engine or crank shaft not shown in the drawings, low temperature being generated in the cold head to cool a coolant.

Note that the expansion piston 26 reciprocally operates which maintaining a certain phase difference between 80° and 120° in advance of the compression piston 10.

Note also that this cycle is a reversible cycle in which power can be obtained by the expansion work of the expansion piston 26 via the piston rod 28b if the cold head is heated to a high temperature. A prime mover obtaining this power is known as a Stirling engine with the inclusion of a refrigerator for generating refrigeration. The mechanical structure is substantially the same whether it is used as a refrigerator or a prime mover.

Also, in the case of a prime mover, the cold head 4 is known as a heater tube or heater.

In addition, upon the cooling flow path system 24 of the first radiator 12 being cooled by a freezing mixture such as liquefied natural gas or the like and the cold head 4 being heated by hot water, flame or the like, the compressing space 11 becomes a low temperature compressing space, the expansion space 27 becomes a high temperature expanding space, and the device becomes a low temperature type Stirling engine which generates power by means of the expansion work of the expansion piston.

(1) Problems involved in the double inlet type pulse tube refrigerator shown in FIG. 1(a)

The flow rate and flow speed of the fluid alternating between the valve 8 and the valve 6, when the fluid flows from the high temperature end 3b of the regenerator 3 and the high temperature end portions 5b and 5b of the pulse tube 5 to the fluid pool 7, and conversely from the fluid pool 7 and the high temperature end portions 5b and 5b to the pulse tube 5 to the high temperature end 3b of the regenerator 3 in one cycle, have optimum flow rate and flow speed values by way of operating conditions (refrigeration cycle, refrigeration temperature, operating frequency, average pressure of fluid, etc.). However, adjustment of these operating conditions is not possible with existing valve structures and therefore it is difficult to meet a coefficient of performance (refrigeration output/power consumption) of 0.01 or more at a refrigeration temperature of 77 K with a compact refrigerator.

(2) Problems involved in the piston type pulse tube refrigerator shown in FIG. 1(b)

The fluid is an operating fluid in the compressing space 11 in the first cycle process which is compressed from 15 atmospheres at 290 K to 28 atmospheres at 350 K. Next, it is cooled in the first radiator 12 by a coolant 24 to reach 300 K at 17 atmospheres and introduced into the regenerator 3. In the final cycle process in which the fluid is subjected to a number of processes and returns to the compressing space 11, the temperature of the fluid when it exits the regenerator 3 and enters the first radiator 12 is approximately 285 K.

Namely, the temperature of the fluid when entering the first radiator 12 from the regenerator 3 side is lower than its temperature when entering the first radiator 12 from the compressing space 11, at approximately 285 K. However, this temperature is low and if the fluid returning at approximately 15 atmospheres is cooled by the coolant 24, e.g. air, whose radiating surface area is large and whose volume is greater than that of the exterior, and then enters the first radiator 12 whose heating capacity is large, the fluid returns to the compressing space 11 at a temperature gradient close to the temperature at which it exited the first radiator 12 from the compressing space 11. Namely, the fluid which returned at 285 K is heated by the first radiator 12 and returns to the compressing space 11 at 300 K or more. Thereby, the initial temperature at which the fluid is compressed is higher, so the temperature after compression also rises and the compression power increases.

Also, the radiator 12 (with the inclusion of the radiator 13), in order to increase the radiation effectiveness by increasing the radiation surface area and thus improve efficiency, has a structure in which complex inner fins are attached within numerous small pipes or flow paths, and numerous perforated plates are overlaid. Therefore, pressure loss due to high fluid resistance is generated and as a result, power consumption increases dramatically.

(3) Problems involved in the stirling cycle type pulse tube refrigerator shown in FIG. 1(c)

Although its efficiency is higher than the pulse tube refrigerator of FIG. 1(a), flow path and mechanical structure problems exist in the radiators 12 and 13 and the valve 6 as explained in (1) and (2) above.

(4) Problems involved in the double piston type double inlet pulse tube refrigerator shown in FIG. 1(d)

FIG. 1(d) shows a structure in which the high temperature end 3b of the regenerator 3 and the high temperature end 5b of the pulse tube 5 of the structure of FIG. 1(c) are connected via the valve 8 to thereby allow the fluid to bypass the regenerator 3 and the pulse tube 5.

Also in this structure, the problems indicated in (1) and (2) above exist in the radiators 12 and 13 and the valves 6 and 8.

(5) Problems involved in the stirling refrigerator shown in FIG. 2(a)

The problems indicated in (2) above exist in the first radiator 12.

Summarizing the problems involved in the prior art techniques set forth above, (1) In the conventional regenerative type engine, the flow rate and flow speed of the reciprocating operating gas cannot be individually controlled and therefore there are limitations to improvements in the efficiency thereof.

(2) In the conventional regenerative type engine, because the reciprocating operating gas follows the same path whether it is the forward path or the backward path, the operating gas passes through the radiator(s) in the forward path and backward path and therefore the cooled operating gas in a refrigerator, for example, enters the radiator in the backward path and is heated, and due to this rise in temperature the compression power increases, leading to a reduction in efficiency.

(3) In the conventional regenerative type engine, because the reciprocating operating gas follows the same path whether it is the forward path or the backward path, the operating gas passes through the radiator(s) in the forward path and backward path. Therefore, pressure loss due to the fluid passing through the radiator(s) occurs in each of the forward and backward paths, and this pressure loss causes an increase in power consumption and reduction of efficiency.

Consequently, the present invention has as its technical object to provide a regenerative type engine which solves the above problems and has good efficiency.

Here, the problems involved in the conventional regenerative type engines will be considered from the viewpoint of the relationship between the position and temperature of the operating fluid.

FIG. 14(a) shows a conceptual view of components with a Stirling refrigerator as an example, and this comprises a compression piston 10, a compression cylinder 9, a compressing space 11 which is defined by the compression piston 10 and the compression cylinder 9, a radiator 12, a coolant path 24 for cooling the radiator 12, a regenerator 3, a cold head 4, a target object 63, an expansion piston 26, an expansion cylinder 25, and an expanding space 27 which is defined by the expansion piston 26 and the expansion cylinder 25. Reference numerals 23 and 231 are piston rings and 64a, 64b, 64c and 64d are connecting pipings for connecting the various components. Note that with regard to the reference numerals, the same reference numerals are shown with the same components as are shown in FIG. 2(a). In the drawing, the compression piston 10 and the expansion piston 26 are each at lower dead center.

FIG. 14(b) is a graph which representatively (L0 to L22) indicates at its abscissa positions corresponding to each component of the Stirling refrigerator shown in FIG. 14(a), and illustrates the relationship between the positions of the various components and the temperatures (ordinate) of the operating fluid at those points.

Firstly, a description will be given with regard to an ideal state. Upon positioning the expansion piston 26 at upper dead center (L20) and moving the compression piston 10 in the direction of upper dead center, the fluid of the compressing space 11 is isothermally compressed at 300 K while being cooled by the radiator 12 (change a→b in the drawing; temperature was constant at Te). Next, upon the compression piston 10 being moved further toward upper dead center and the expansion piston 26 moving to position L21, the fluid of the compressing space 11 passes through the radiator 12 and isochorically enters the expanding space 27 while being cooled by the regenerator 3. The temperature change is indicated by b→c in the drawing. Further, upon the expansion piston moving toward lower dead center, the fluid of the expanding space 27 isothermically expands while cooling the object to be cooled 63 in the cold head 4. The expansion piston 10 is at position L22, the temperature change is c→d, and the cooling temperature Te is constant at 80 K. Finally, when the expansion piston 26 moves to the upper dead center and the compression piston 10 moves toward lower dead center, the fluid of the expanding space 27 passes through the cold head 4, is heated from temperature c by the regenerator 3 to reach a temperature b (Tc=300 K), and enters the compressing space 11 to complete the cycle.

Although the above describes the operation in the case of an ideal cycle, The stirling cycle comprises the four processes of isothermic compression, isochoric modification, isothermic expansion and isochoric modification, and this is already well-known. Note that the expansion piston 26 moves with a phase difference substantially 90° in advance of the compression piston 10.

Next, the operation of a conventional refrigerator will be explained.

A fluid such as, for example, helium at 20 atms is introduced into a machine which includes a compressing space 11. The fluid temperature at each position within the machine in a steady state when operated for a given time period is taken the temperature change indicated by the single chain line.

Although the fluid temperature in the compressing space 11 is initially operated at the constant temperature Tc (e.g. 300 K), upon reaching a constant temperature state the temperature rises so that the temperature Tc1 (e.g. 320 K) at the lower dead center of the compression piston 10 increases. In the compression process in which the compression piston 10 approaches the upper dead center, the fluid temperature rises to become f1 (e.g. 335 K). Subsequently, in the isochoric process where volume is constant, the fluid enters the regenerator 3 and is cooled to c1 (e.g. 75 K), then enters the expanding space 27. Upon the expansion piston 26 moving to the lower dead center (L22), the fluid of the expanding space 27 is isothermically expanded (in reality, polytropically expanded) while cooling the target object 63, dropping in temperature from c1 to d1. Finally, upon the expansion piston 26 approaching the lower dead center, because the compression piston 10 also approaches the lower dead center, the fluid in the expanding space 27 is pushed outward, enters the regenerator 3 at a raised temperature of c2, is gradually heated so that its temperature rises to become b2 (e.g. 310 K). Then, although it enters the radiator 12, where the operating frequency is high (e.g. 6 to 25 Hz), because the heating capacity is large due to the internal fins and numerous pipes which increase the heat transfer area, the fluid temperature does not decrease to the temperature of the coolant 24 but instead rises, then enters the compressing space 3 and finishes the cycle at the temperature Tc1.

The present invention concerns a method for increasing the efficiency of a regenerative type engine by making the fluid temperatures Tc1, f1 and b1 come as near as possible. If the temperature of Tc1 decreases, f1 and b1 also automatically fall. The temperature span between the warm end temperature b1 and the cold end temperature c1 of the regenerator 3 (and similarly the difference between b2 and c2) decreases, the heating load on the regenerator 3 decreases, the amount of work for generating the cooling temperature Te decreases even when the cooling output is constant, and the efficiency increases.

SUMMARY OF THE INVENTION

The present invention relates to an improvement in the efficiency of a refrigerator or prime mover for generating low temperatures or power by means of the above heat cycle, and basically relates to a regenerative type engine with fluid control mechanism which increases the heat radiation effect in a radiator (heat exchanger) by having, disposed in a fluid path system, a flow rate and flow path controller which includes a cock for controlling the direction of flow of the fluid or alternatively for simultaneously adjusting the flow rate, flow speed, pressure, etc. according to the direction of flow of the fluid, and which at the same time reduces pressure loss and improves the efficiency of existing refrigerators by 15 to 25% and prime movers by 15%.

Namely, in order to solve the above technical problems, the technical means conceived of in the present invention, in a regenerative type engine with fluid control mechanism, which regenerative type engine connects a pressure fluctuation source, a regenerator, a heat absorber and a phase regulating mechanism in series, and performs low temperature generation or generates power by imparting a phase difference on reciprocation and pressure fluctuation of an operating fluid, the regenerative type engine comprises a flow rate controller arranged in a position which is at least between the pressure fluctuation source and the regenerator or between the phase regulating mechanism and the heat absorber, for controlling at least one of a flow rate in an forward process and a flow rate in an backward process.

The operation of the above technical means will be explained as follows. By means of the flow rate controller disposed either between the pressure fluctuation source and the regenerator or between the phase regulating mechanism and the heat absorber, at least one of the flow rate in the forward path and the flow rate in the backward path of the operating fluid within the system is independently controlled. Therefore, the flow rate and pressure of the operating fluid are independently controllable for each flow in the forward path and the backward path and the regenerative engine can be operated under optimum operating conditions.

Here, the forward path of the operating fluid indicates the flow of the operating fluid from the pressure fluctuation source to the regenerator, from the regenerator to the heat absorber, and from the heat absorber to the phase regulating mechanism, and the backward path of the operating fluid indicates the flow of the operating fluid from the phase regulating mechanism to the heat absorber, from the heat absorber to the regenerator, and from the regenerator to the pressure fluctuation source.

Also, in order to solve the above technical problems, the technical means conceived of in the present invention, in a regenerative type engine with fluid control mechanism, which regenerative type engine connects a pressure fluctuation source, a regenerator, a heat absorber and a phase regulating mechanism in series, and performs low temperature generation, or generates power by imparting a phase difference on reciprocation and pressure fluctuation of an operating fluid, comprises a radiator arranged in a position which is at least between the pressure fluctuation source and the regenerator or between the heat absorber and the phase regulating mechanism, and a flow path controller connected to the radiator, for connecting a flow path in an forward process of an operating fluid within a regenerative type engine system to the radiator and regulating the flow path in the forward process and the flow in the backward process so that the flow path in the backward process bypasses away from the radiator.

The operation of the above technical means will be explained as follows. By means of the flow path controller disposed either between the pressure fluctuation source and the regenerator or between the heat absorber and the phase regulating mechanism, the flow paths of the forward flow and the backward flow of the operating fluid within the system can each be controlled. Also, the flow path in the forward process is constructed so as to pass through the radiator disposed connected to the flow path control means and the flow path in the backward process is constructed so as to bypass the radiator. Therefore, when the flow path controller is between the pressure fluctuation source and the regenerator, the operating fluid enters the regenerator from the pressure fluctuation source through the radiator in the forward process, and in the backward process returns to the pressure fluctuation source from the regenerator without passing through the radiator. Also, when the flow path controller is between the heat absorber and the phase regulating mechanism, the operating fluid enters the phase regulating mechanism from the heat absorber through the radiator in the forward process, and in the backward process returns to the heat absorber from the phase regulating mechanism without passing through the radiator. Consequently, temperature increase and pressure loss due to the operating fluid passing through the radiator in the backward path can be reduced.

In solving the above technical problems, it is preferable for the flow path controller to comprise a first fluid passage through which the operating fluid in an forward path passes and a second fluid passage through which the operating fluid in an backward path passes. By constructing the regenerative type engine in this way, the operating fluid which reciprocates within the system passes through the first fluid passage of the flow path controller in the forward path and through the second fluid passage of the flow path controller in the backward path.

Also, in solving the above technical problems, it is preferable for the flow path controller to comprise a second fluid passage through which the operating fluid in an backward path passes, and for the operating fluid in an forward path to bypass the flow path controller. According to the above structure, the operating fluid in the forward path passes through the radiator by bypassing the flow path controller. On the other hand, the operating fluid in the backward path passes through the second fluid passage of the flow path controller by bypassing the radiator. This can be realized by a simple structure in which forward path piping and backward path piping are each disposed either between the pressure fluctuation source and the regenerator or between heat absorber and the phase regulating mechanism, the forward path piping passing through the radiator and the backward path piping not passing through the radiator, and interposing midway therein a one-way valve (flow path controller) which passes only the forward path piping. In this structure, the forward flow of the operating fluid passes directly through the radiator and the backward flow of the operating fluid flows through the backward path piping which bypasses the radiator. Thereby, because the structure of the flow path controller becomes extremely simple and the backward flow does not pass through the flow path controller, pressure loss is further reduced and efficiency improved.

More preferably, the regenerative type engine with fluid control mechanism comprises a flow rate controller, installed in at least one of the first fluid passage and the second fluid passage, for controlling the flow rate of the operating fluid passing through its interior. This is a structure which attaches a flow rate control function to the flow path controller. Namely, in the operating fluid which reciprocates within the system, the forward flow thereof passes through the first fluid passage of the flow path controller and the backward flow flows through the second fluid passage of the flow path controller. At such times, the flow rate of the operating fluid passing through the passages is controlled by a flow rate controller provided in the midsection of at least one of the first fluid passage and the second fluid passage. By integrating the flow path controller and flow rate controller in this manner, control of the operating fluid can be realized by a further simplified structure.

Even more preferably, the regenerative type engine with fluid control mechanism comprises a flow rate controller, installed in the second fluid passage, for controlling the flow rate of the operating fluid in the forward path. This structure also has a flow rate control function attached to the flow path controller in the same manner as described above. By integrating the flow path controller and flow rate controller in this manner, control of the operating fluid can be realized by an even simpler structure.

Even more preferably, in the first fluid passage, a valve mechanism having a valve plate which is urged in an backward direction of the operating fluid is provided, and passage of the operating fluid in the backward path to the first fluid passage is blocked by this valve mechanism, and in the second fluid passage, a valve mechanism having a valve plate which is urged in an forward direction of the operating fluid is provided, and passage of the operating fluid in the forward path to the second fluid passage is blocked by this valve mechanism. According to this structure, because a valve mechanism having a valve plate which is urged in an backward direction of the operating fluid is provided in the first fluid passage, upon the backward flow attempting to enter the first passage, it is impossible for the backward flow to enter because the valve plate is even further urged in that direction. On the other hand, upon the forward flow attempting to enter the first passage, the valve opens due to the resistive force moving against the urging force of the valve, and the forward flow can pass through the first passage. Also, because a valve mechanism having a valve plate which is urged in an forward direction of the operating fluid is provided in the second fluid passage, upon the forward flow attempting to enter the second passage, it is impossible for the forward flow to enter because the valve plate is even further urged in that direction. On the other hand, upon the backward flow attempting to enter the second passage, the valve opens due to the resistive force moving against the urging force of the valve, and the backward flow can pass through the second passage.

Also, still more preferably, the second fluid passage comprises a valve mechanism having a valve plate which is urged in an forward direction of the operating fluid, and passage of the operating fluid in the forward path to the second fluid passage is blocked by this valve mechanism. According to this structure, because a valve mechanism having a valve plate which is urged in the forward direction of the operating fluid is provided in the second fluid passage, upon the forward flow attempting to enter the second passage, it is impossible for the forward flow to enter because the valve plate is even further urged in that direction. Also, upon the backward flow attempting to enter the second passage, the valve opens due to the resistive force moving against the urging force of the valve, and the backward flow can pass through the second passage.

Yet more preferably, the flow rate controller is formed by a cock which controls the flow rate of an operating fluid passing through a flow path in which the flow rate controller is installed. This structure is formed by a simple, inexpensively assembled cock as the flow rate controller provided in the midsection of the first or second passage.

In addition, in a pulse tube regenerative type engine with fluid control mechanism, which pulse tube regenerative type engine connects a pressure fluctuation source, a regenerator, a heat absorber, pulse tube and a phase regulating mechanism in series, performs low temperature generation, or generates power by imparting a phase difference on reciprocation and pressure fluctuation of an operating fluid, and comprises a double inlet passage for connecting a high temperature end of the regenerator and the high temperature end of the heat absorber, and a flow rate controller for independently controlling at least one of a flow rate in an forward path and a flow rate in an backward path of the operating fluid within the double inlet passage.

The operation of the technical means described above is as follows. Namely, at least one of a flow rate in an forward path and a flow rate in an backward path of the operating fluid which reciprocates within the double inlet passage is independently controlled by a flow rate controller. Here, the forward path of the operating fluid which reciprocates within the double inlet passage is the flow path of the operating fluid toward the phase regulating mechanism from the pressure fluctuation source, and the backward path of the operating fluid is the flow path of the operating fluid toward the pressure fluctuation source from the phase regulating mechanism.

In a double inlet type pulse tube regenerative engine, by controlling the flow rate, pressure, etc. of the operating fluid reciprocating within the double inlet, it is possible to devise further optimizing of the operating conditions of the regenerative engine. In addition, by individually controlling the flow rate, pressure, etc. of the operating fluid in the forward flow and the backward flow, the regenerative engine can be further operated under optimum conditions.

In particular, the double inlet type regenerative engine, in addition to an alternating flow of the reciprocating operating fluid, also has a direct flow which circulates through the regenerator, the heat absorber, the pulse tube and the double inlet passage. Although this direct circular flow gives rise to a detrimental effect on the efficiency of the regenerative engine, by controlling the flow in the double inlet passage of the above structure, it becomes possible to control this type of circular flow and further improve efficiency.

In solving the above technical problems, the pulse tube regenerative type engine with fluid control mechanism further comprises a flow path controller for controlling an forward path and backward path of the operating fluid which reciprocates within the double inlet passage. This structure independently controls the flow path in the forward direction and the flow path in the backward direction of the operating fluid reciprocating within the double inlet passage system by means of a flow path controller.

More preferably, the flow path controller comprises a third passage through which the operating fluid in an forward process passes and a fourth passage through which the operating fluid in an backward process passes. According to this structure, the forward flow of the operating fluid passing through the double inlet passage passes through the third fluid passage of the flow path controller and the backward flow passes through the fourth fluid passage.

Even more preferably, in the third passage, a valve mechanism comprising a valve plate which is urged in an backward direction of the operating fluid is provided, and passage of the operating fluid in a backward path to the third passage is blocked by this valve mechanism, and in the fourth passage, a valve mechanism comprising a valve plate which is urged in an forward direction of the operating fluid is provided, and passage of the operating fluid in an forward path to the fourth passage is blocked by this valve mechanism. According to this structure, since a valve mechanism comprising a valve plate which is urged in an backward direction of the operating fluid is provided in the third passage, upon the backward flow attempting to enter the third passage, it is impossible for the backward flow to enter because the valve plate is even further urged in that direction. On the other hand, upon the forward flow attempting to enter the third passage, the valve opens due to the resistive force moving against the urging force of the valve, and the forward flow can pass through the third passage. Also, since a valve mechanism comprising a valve plate which is urged in a forward direction of the operating fluid is provided in the fourth passage, upon the forward flow attempting to enter the fourth passage, it is impossible for the forward flow to enter because the valve plate is even further urged in that direction. On the other hand, upon the backward flow attempting to enter the fourth passage, the valve opens due to the resistive force moving against the urging force of the valve, and the backward flow can pass through the fourth passage.

Still more preferably, the flow rate controller is formed by a cock which controls the flow rate of an operating fluid within a flow path in which the flow rate controller is installed. Thereby, regulation of the flow rate and flow path can be achieved with a simple structure.

Note that, in the present invention, where the regenerative engine is used as a refrigerator, the portion which stores heat is known as a cold regenerator and the portion which generates refrigeration is known as a cold head. On the other hand, where the regenerative engine is used as a prime mover, the portion which stores heat is known as a heat accumulator and the portion which absorbs heat is known as a heater. The cold regenerator and heat accumulator can collectively be called regenerator. Also, the cold head and heater are no different in that they are portions which absorb heat and, therefore, they can be collectively called heat absorber. In the regenerative type engine, the cold regenerator corresponds to the heat accumulator and the cold head to the heater. Also, the present invention is applicable to a regenerative type engine used in either a refrigerator or a prime mover.

BRIEF DESCRIPTION OF THE DRAWINGS

These and other features, aspects and advantages of the present invention will become better understood with reference to the following description, appended claims and accompanying drawings, wherein:

FIG. 2 includes views showing the flow path system and mechanical structure of a Stirling engine, (a) being a conventional Stirling engine and (b) being a Stirling engine according to the present invention;

DETAILED DESCRIPTION OF THE INVENTION

Figure 1A:
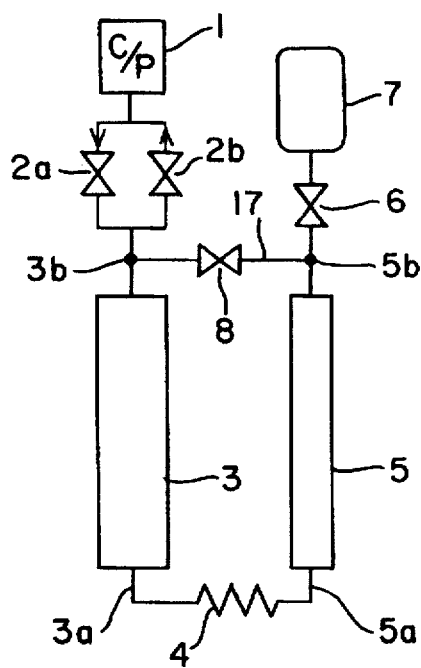
FIG. 1 is a view showing the flow path system and mechanical structure of a conventional pulse tube type regenerative engine (a) being a flow path diagram of a pulse tube refrigerator, (b) being a piston type pulse tube refrigerator, (c) being a flow path diagram of a stirling cycle type pulse tube refrigerator, and (d) being an improved a structure of FIG. 1(c)
Figure 1B:
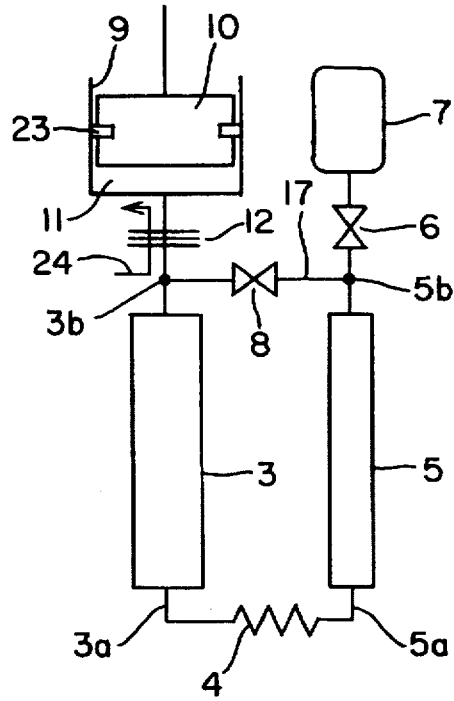
Figure 1C:
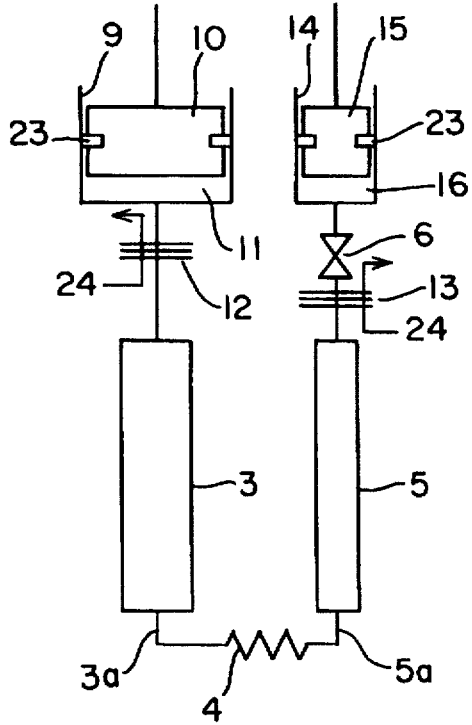
Figure 1D:
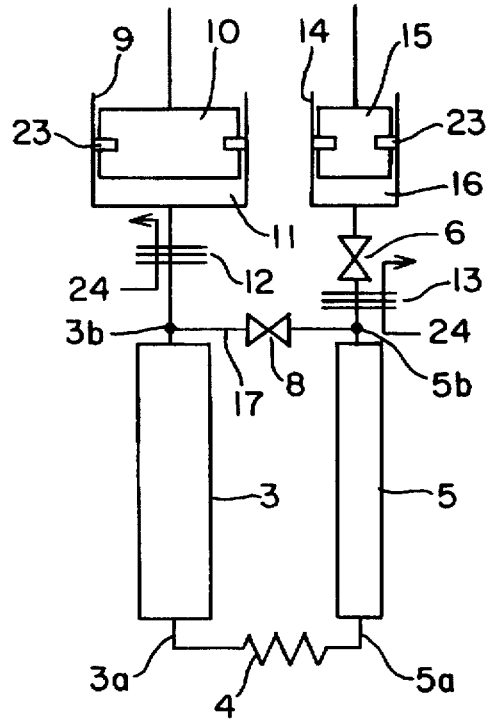
Figure 3A:
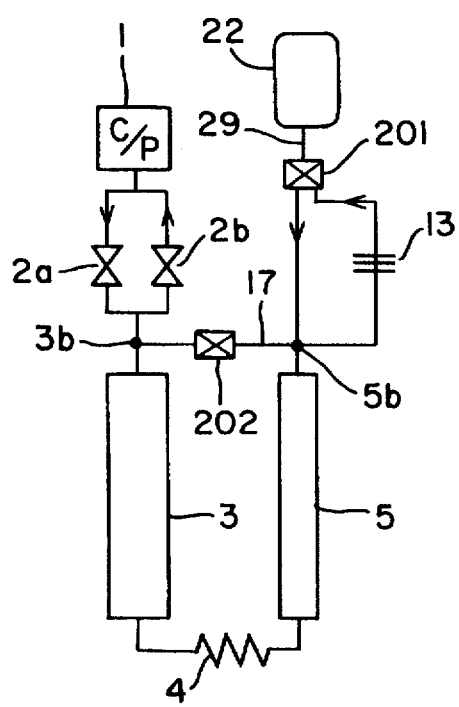
FIGS. 3(a–d) each is a view showing the flow path system and mechanical structure of a pulse tube type regenerative engine of the present invention.

Although the factors which reduce the efficiency of the regenerative engine have been explained in the prior art, because the present invention excludes these loss factors, the applicants have developed a fluid control mechanism in which the fluid passes through or does not pass through the radiator depending on the direction of flow of the fluid in the cycle process and which can adjust the flow rate by opening a cock depending on the direction of flow, and this is attached in the flow path system to improve the heating cycle and to further improve the efficiency of the refrigerator or prime mover. The flow path system in which the fluid controller is attached is shown in FIG. 2(b) and FIGS. 3(a), (b), (c) and (d). The structure of the fluid controller itself is shown in FIGS. 4 to 11. Also, those portions which are the same as in the prior art have been given the same reference numerals and explanation thereof is omitted herein.

Since the range of applications of the fluid controller of the present invention is wide, it will be described mainly with respect to examples applied to a pulse tube type refrigerator and a Stirling engine. Also, in the following, the flow rate controller and flow path controller for controlling the flow rate and flow path of the operating fluid will be generally referred to as fluid controllers.

[First Embodiment]

Figure 4:
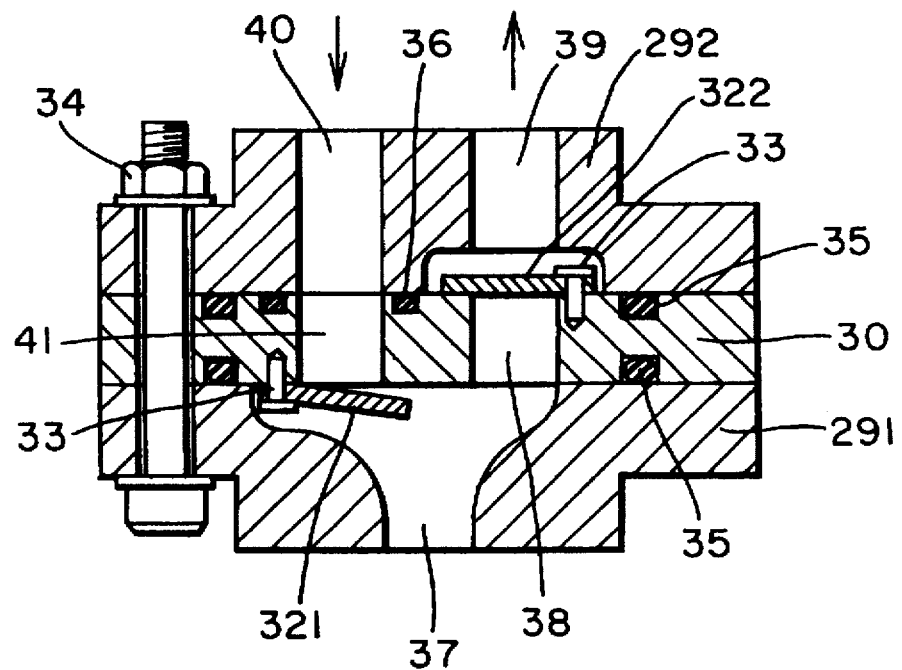
FIG. 4 is a partial cross-sectional view of a fluid controller in a first embodiment of the present invention.

FIG. 4 is a partial cross-sectional view of the structure of a fluid controller which is the first embodiment of the present invention, the fluid from flow paths 40 and 41 entering a flow path 37 via a plate spring type valve plate 321. The opposing flow enters a flow path 39 from flow paths 37 and 38 via a valve plate 322.

Note that the reference numeral 30 is a flange having two valve plates, 35 and 36 are O-rings, 291 and 292 are also flanges having flow path openings, and 34 is a bolt/nut.

The operation of this fluid controller will be described based on FIG. 4 and FIG. 2(b). Note that in this case, the fluid controller shown in FIG. 4 is indicated by reference numeral 19 in FIG. 2(b).

In FIG. 2(b), upon the piston 10 approaching the upper dead center, the liquid from the compression space 11 as the forward flow is compressed and enters the first radiator 12 from a flow path opening 55 of the compression space, is cooled by the coolant 24 such as air for example, and enters the first fluid controller 29 from a flow path pipe 56.

In other words, the fluid from the compression space 11 as the forward flow enters the flow paths 40 and 41 in the cross-sectional structural drawing of the fluid controller shown in FIG. 4, opens the valve plate 321 to enter the flow path 37, and from the flow path 37, enters the regenerator 3 from the flow path pipe 57 of FIG. 2(b).

Note that the compressed fluid does not go from the valve plate 321 to the regenerator 3 and enter the flow path 38, valve plate 322 and flow path 39. This is because the fluid compressed in the compression space 11 is cooled by the first radiator 12, decreases in pressure from its initial pressure, and passes through the valve plate 321. Although the valve plate 322 is subjected to direct pressure from the compression space 11 via the flow path pipe 58 which closes the valve plate, this pressure is higher than the pressure applied from the flow path 37 side since the operating fluid is cooled by the first radiator 12. Therefore, the valve plate 322 does not open.

In other words, when the refrigerator is operated, dynamic pressure is applied to the valve plates 321 and 322, and in the compression processing of the fluid, the strength of the pressure in each of the flow paths is P39>P41>P37 (P39 is the pressure in the flow path 39, P41 is the pressure in the flow path 41 and P37 is the pressure in the flow path 39), and when P39>>P37 the valve plate 322 does not open. Also, when the compression piston 10 approaches the upper dead center, a compression process or an isochoric process is in the heating cycle and the pressure of the expansion space 27 is less than that in the flow path 37.

In the isochoric and expansion processes in which the compression piston 10 moves toward the lower dead center during the heating cycle, the pressure of the compression space 11 is less than that in the regenerator 3. Therefore, the fluid returning from the regenerator 3 as the backward flow opens the valve plate 322 due to the difference in pressure increasing from the flow path pipe 57 to the flow path 37, from the flow path 37 to the flow path 38, and from the flow path 38 to the flow path 39, then returns to the compression space 11 from the flow paths 39 and 58 and the inlet 581.

In other words, the previous function and dynamic pressure distribution are opposite. This is P37>P41>P39, with P37>>P39, so the valve 321 does not open. As a result, the forward flow and backward flow are separately controlled, and only the backward flow when the fluid returns from the regenerator 3 to the compression space 11 can be made to bypass the first radiator 12. Note that this is also operable where the flow path opening 55 and the inlet 58 are combined to guide the fluid. Also, reference numeral 33 indicates set screws for the valve plates 321 and 322.

Figure 5:
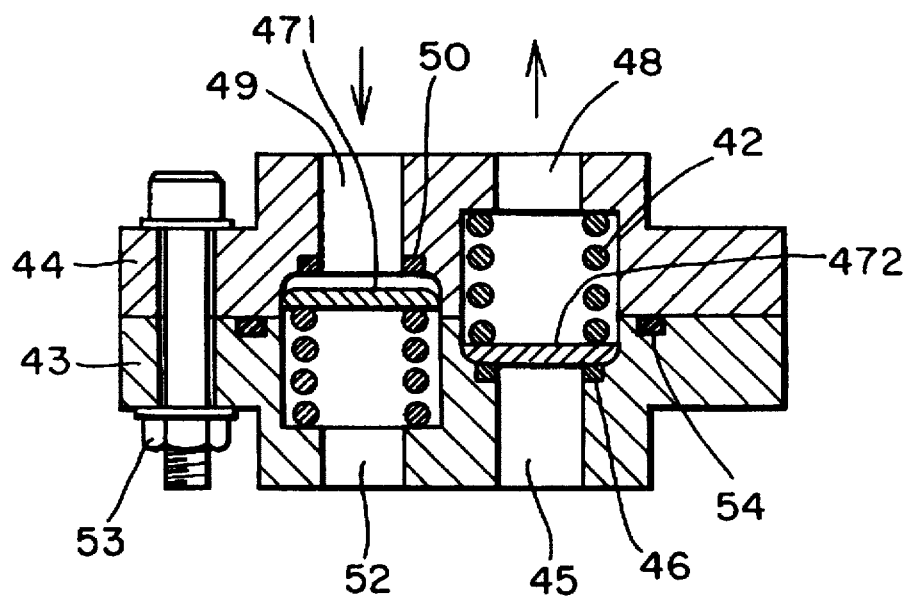
FIG. 5 is a partial cross-sectional view of another fluid controller in the first embodiment of the present invention.

FIG. 5 is a cross-sectional view of a fluid controller whose structure is simpler, with less components, than that in FIG. 4, and which can respond even when the operating frequency is high. Springs 42 are used as the urging force of the valve plates, to facilitate durability and the responsiveness of the valves.

This fluid controller has as its main components valve casings 43 and 44 which have valve plates 471 and 472 and valve seats 46 and 50, a set bolt and nut 53 and an O-ring 54, the flow paths 49 and 48 corresponding to 40 and 39 in FIG. 4. If the flow paths 52 and 45 are lead into one opening, they would each correspond to the flow path 37 of FIG. 4.

Also, in the structure shown in FIG. 5, since the flange 30 having two valve plates in FIG. 4 can be excluded, the structure can be further simplified and at the same time the flow path length is shortened and dead volume reduced. Note that the operation of the fluid controller shown in FIG. 5 will not be explained here since it is substantially the same as the above descriptions based on FIG. 4 and FIG. 2(b).

Another example of an application of the fluid controller 19 shown in FIGS. 4 and 5 to a regenerative engine is indicated by the reference numeral 19 of the flow path system of the refrigeration cycle shown in FIG. 2(b) and FIGS. 3(a), (b), (c) and (d), by which the pressure loss by way of the first radiator 12 is halved and efficiency improved to reduce the power consumption of the refrigerator.

Note that, in FIG. 4, flow paths 40 and 41 correspond to the first fluid passage of the present invention and flow paths 38 and 39 to the second fluid passage of the present invention, and in FIG. 5, the flow paths 49 and 51 correspond to the first fluid passage of the present invention, while flow paths 45 and 48 to the second fluid passage of the present invention.

[Second Embodiment]

Figure 6A:
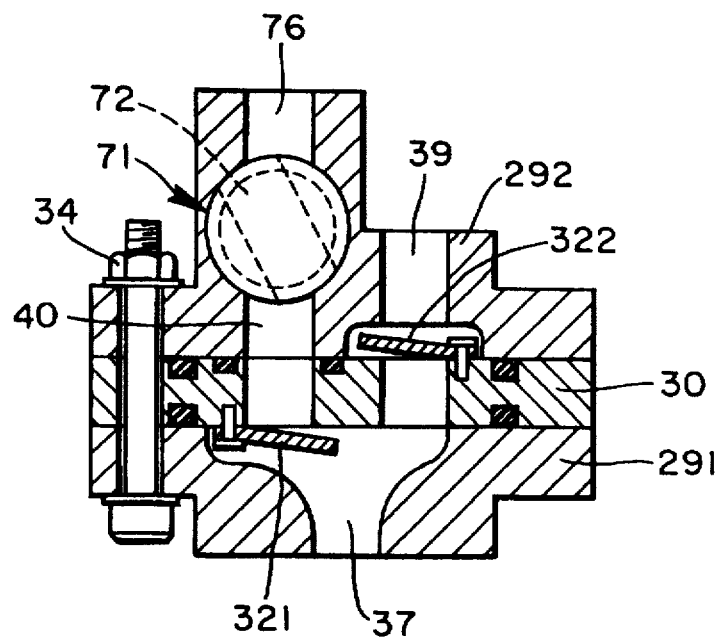
FIG. 6 includes views of a fluid controller in a second embodiment of the present invention, (a) being a partial cross-sectional view of the fluid controller, (b) being a perspective view of a cock, (c) being a cross-sectional view of the cock and (d) being a front view of the cock.
Figure 7A:
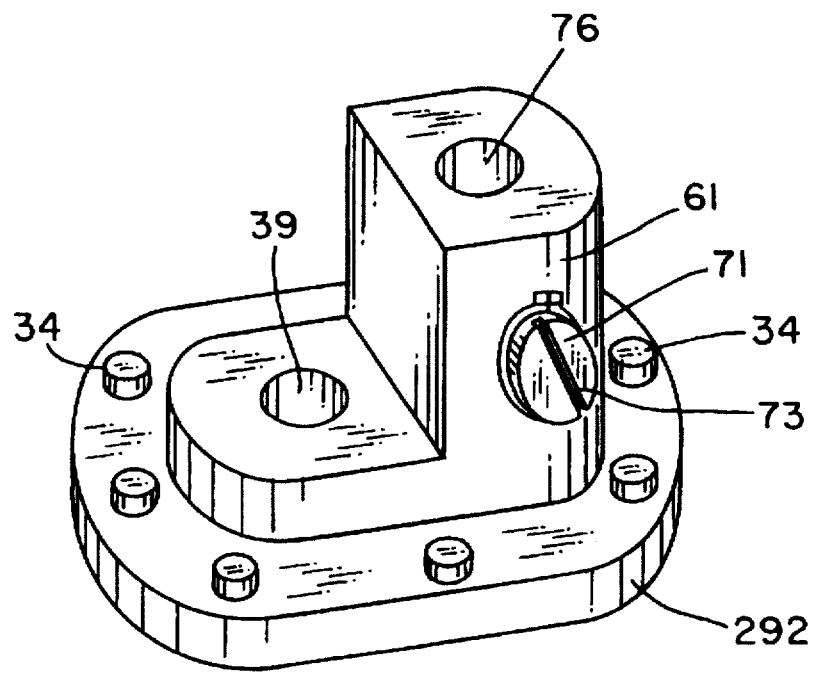
FIG. 7 is includes views of the fluid controller in the second embodiment of the present invention, (a) being a perspective view the fluid controller and (b) being a front view thereof.
Figure 7B:
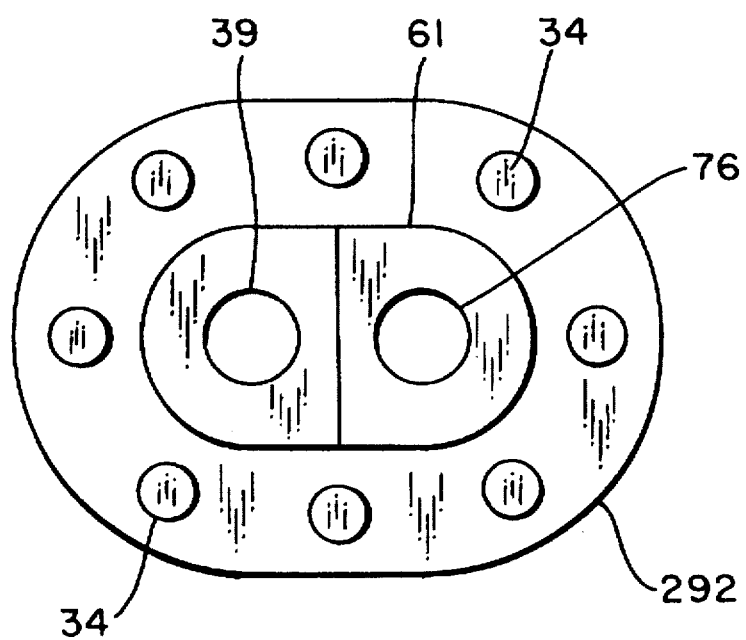

A partial cross-sectional view of the fluid controller which is the second embodiment of the present invention is shown in FIG. 6(a), while a perspective view is shown in FIG. 7(a) and a plan view is shown in FIG. 7(b). That which is shown in FIG. 6(a) is a structure integrated by attaching a cock to the valve mechanism of the fluid controller shown in FIG. 4, and which performs adjustment of the flow rate, flow speed and pressure of the fluid in one direction.

Figure 6B:
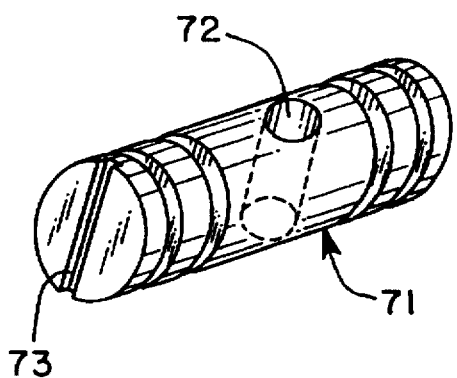
Figure 6D:
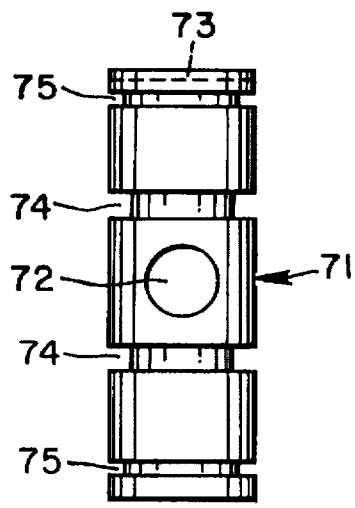
Figure 6C:
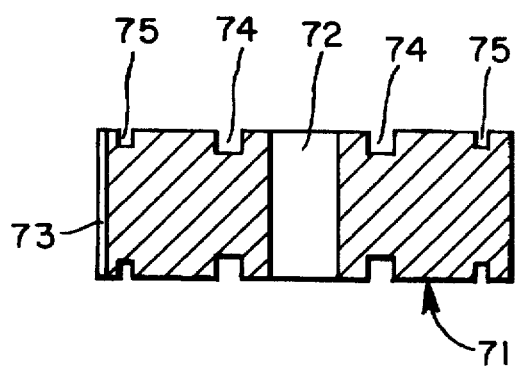

A perspective view of the cock is shown in FIG. 6(b), a cross-sectional view in FIG. 6(c) and a front view in FIG. 6(d).

In FIG. 6(a) and FIG. 7, 71 is the cock, 72 is the fluid passage of fluid passing through the cock, 73 is a cock rotation groove carved parallel to the fluid passage 72 for showing the valve opening rate, 74 is an O-ring groove, 75 is a cock stopper groove and 76 is a flow path, the other reference numerals being the same as in FIG. 4. The operation of the fluid controller shown in FIG. 6(a) will be described with reference to FIG. 3(a) and FIG. 6(a). In this case, the fluid controller shown in FIG. 6(a) is applied to a portion of the second fluid controller indicated by reference numeral 201 in FIG. 3(a).

The high pressure fluid from the compressor 1 enters the regenerator 3 from the high temperature end 3b of the regenerator 3 upon the inlet valve 2a opening, has its temperature decreased by being gradually cooled by a regenerative material in the regenerator 3, passes through the cold head 4 and the pulse tube 5 at a low temperature, is made confluent in the high temperature end 5b of the pulse tube 5 with fluid which has passed through a third fluid controller 202 (described later) from the high temperature end 3b of the regenerator 3, and is cooled by the second radiator 13 to enter a second fluid controller 201. The fluid which has entered the second fluid controller 201 passes through the flow path 76, fluid passage 72 of the cock 71 which is opened to an appropriate degree, fluid path 40 and valve plate 321 shown in FIG. 6(a), and enters the fluid tank 22 through the guide pipe 29 shown in FIG. 3(a) from the flow path 37. Subsequently, upon the inlet valve 2a closing and the discharge valve 2b closing, and the fluid within the system carries out adiabatic expansion work on the fluid returning to the compressor 1 from the discharge valve 2b to reduce temperature. The fluid of the fluid tank 22 passes through the flow path 37, valve plate 322 and flow path 39 shown in FIG. 6(a) from the guide pipe 29, bypasses the second radiator 13, cools a target object to be cooled in the pulse tube 5 and cold head 4, is subjected to a temperature drop by imparting heat or cold on the regenerative material in the regenerator 3, and returns from the high temperature end 5b of the pulse tube 5 to the compressor 1 through the discharge valve 2b together with fluid from the third fluid controller 202. The cycle finishes upon closing of the discharge valve 2b.

By introducing the fluid controller, the fluid entering the fluid tank 22 from the warm end of the pulse tube 5 can enter after being cooled by the second radiator 13, and optimum values of the flow rate, flow speed and pressure thereof can be achieved by adjustment of the cock so that the efficiency of the refrigerator is at maximum.

Figure 3B:
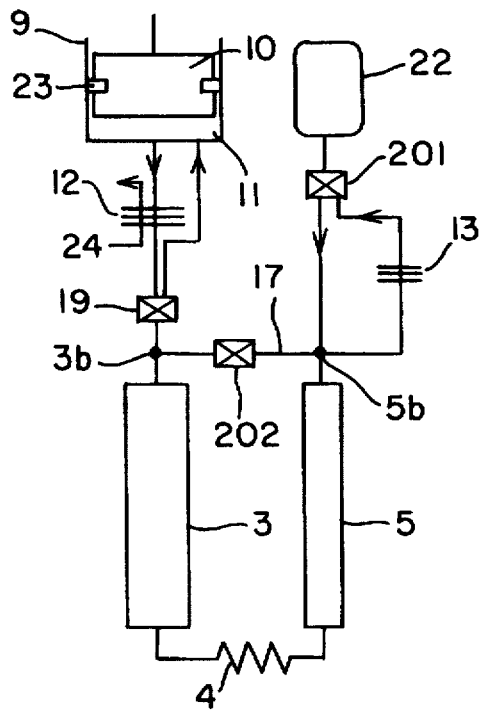
Figure 3C:
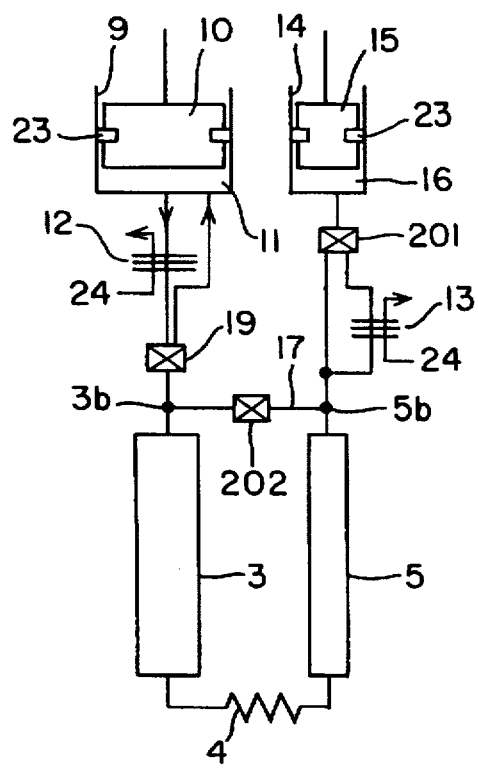
Figure 3D:
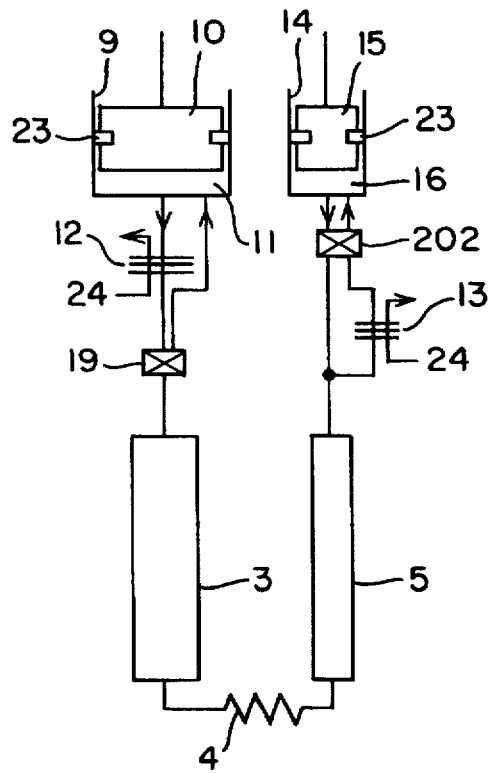

Another example of application of the fluid controller is indicated by 201 in FIGS. 3(b) and (c).

In FIG. 6(a) the flow paths 56 and 40 correspond to the third fluid passage of the present invention and the flow path 39 corresponds to the fourth fluid passage of the present invention. Also, the cock 57 corresponds to the first regulating means of the present invention.

[Third Embodiment]

Figure 8:
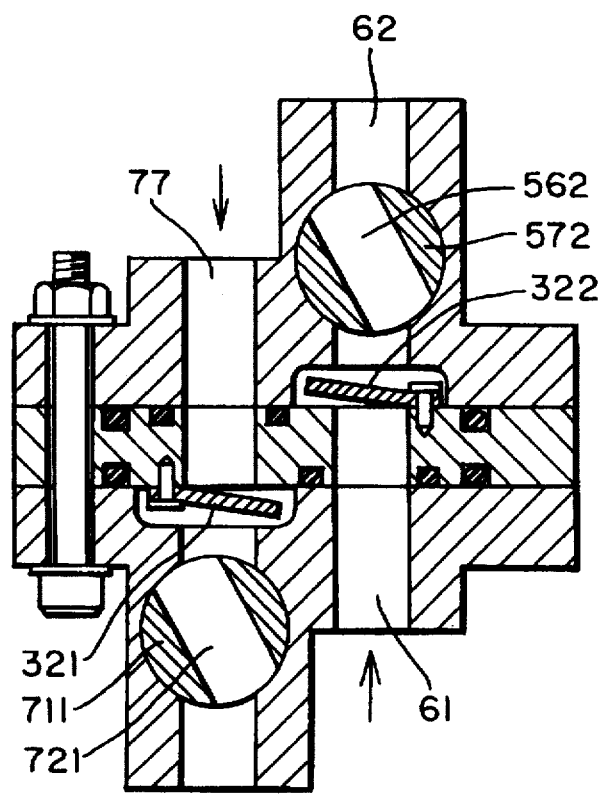
FIG. 8 is a partial cross-sectional view of a fluid controller in a third embodiment of the present invention.

FIG. 8 shows a cross-sectional view of a fluid controller which is a third embodiment of the present invention. This is a structure which is integrated by attaching two cocks to the fluid controller shown in FIG. 4, and performs adjustment of respective flow rates, flow speeds and pressures of the fluid.

This application example of the fluid controller is one in which it is applied to the third fluid controller indicated by the reference numeral 202 in FIG. 3.

The operation of the pulse tube refrigerator will be described using FIG. 8, FIG. 6(a) and FIG. 3(a).

As shown in FIG. 3, of the high pressure fluid from the compressor 1, most of the fluid enters the regenerator 3 from the high temperature end 3b of the regenerator 3 upon opening of the inlet valve 2a, is then gradually cooled by the regenerative material within the regenerator 3 so that its temperature drops, passes through the cold head 4 and the pulse tube 5 upon reaching a low temperature, is made confluent with fluid which has come from the high temperature end 3b of the regenerator 3 through the third fluid controller 202 at the high temperature end 5b of the pulse tube 5, is cooled by the second radiator 21 and enters the second fluid controller 201, passes through the fluid path 76 of FIG. 6(a) and the flow path 72, flow path 40 and valve plate 321 of the cock 71 which is opened to an appropriate degree, passes through the flow path 37, then enters the fluid tank 22 through the guide pipe 29 of FIG. 3(a). Upon the inlet valve closing and the discharge valve opening, the fluid within the system exerts adiabatic expansion work on the fluid returning to the compressor 1 from the discharge valve 2b to cause a temperature drop. The fluid of the tank 22 cools a target object to be cooled by passing from the guide pipe 29 through the flow path 37, the valve plate 322, flow path 39, pulse tube 5 and cold head 4 of FIG. 6(a), increases in temperature by imparting cold or heat on the regenerative material in the regenerator 3, is made confluent in the high temperature end 3b of the regenerator 3 with fluid which has passed through the fluid controller 202 from the high temperature end 5b of the pulse tube 5, then returns to the compressor 1 from the discharge valve 2b. The cycle finishes upon the valve 2 closing.

The fluid entering the fluid controller 202 from the high temperature end 3b of the regenerator 3 enters the fluid controller 202 from a flow path 77 shown in FIG. 8, then passes through the valve plate 321 and a flow path 721 of the cock 711 which is opened to an appropriate degree, to reach the high temperature end 5b of the pulse tube 5 from the fluid controller 202. Also, fluid entering the fluid controller 202 from the high temperature end 5b of the pulse tube 5 enters the fluid controller 202 from the flow path 61 of FIG. 8, and passes through the valve plate 322 and a flow path 722 of the cock 712 which is opened to an appropriate degree to reach the high temperature end 3b of the regenerator 3 from the fluid controller 202.

The flow paths 77 and 62 and flow paths 721 and 61, when the refrigeration capacity is low, are guided into one opening such as the flow path 37 of FIG. 4, so that the optimum flow rate, flow speed and pressure of the fluid flowing in both forward and backward directions can be adjusted.

This third fluid controller 202 can also be used in place of the second fluid controller 201. For example, when the third fluid controller 202 is used in place of the second fluid controller 201, it becomes the structure shown in FIG. 3(d) with the exclusion of the fluid controller 202, so that further simplification of the flow path system is possible. However, the flow paths 77 and 62, 721 and 61 have been introduced into the flow path system to be connected to other machines as independent flow paths and are guided into one opening.

Note that, in FIG. 8, the flow paths 77 and 721 correspond to the first fluid passage of the present invention and the flow paths 61, 722 and 62 correspond to the second fluid passage of the present invention. Also, in the case of this embodiment, the cocks 711 and 712 correspond to the flow rate controller of the present invention. In addition, the fluid controller shown in FIG. 8 can of course be applied to fluid controllers of other sections. For example, the fluid controller shown in FIG. 8 can be applied in place of the first fluid controller indicated by reference numeral 19 and the second fluid controller indicated by reference numeral 201 in FIG. 3(b).

Note also that although the present invention has been described with respect to a structure of a regenerative type engine as a single-step type, generation of 20 K or less and 4 K is possible by combining a number of steps according to the refrigeration temperature.

[Fourth Embodiment]

Figure 9:
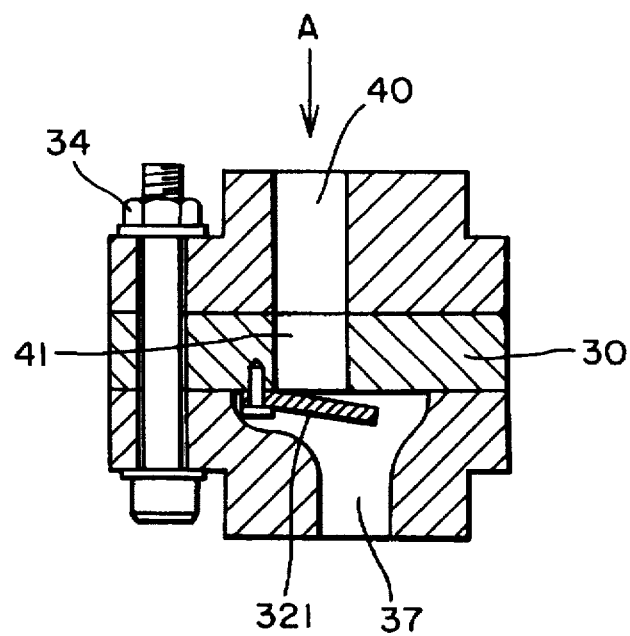
FIG. 9 is a partial cross-sectional view of a fluid controller utilizable in the fourth to seventh embodiments of the present invention.

FIG. 9 is a cross-sectional view of the fluid controller used in the fourth embodiment, and functions as a one-way valve. In the drawing, fluid paths 40, 41 and 37 are formed in the interior of the fluid controller. A valve plate 321 is disposed between the flow path 41 and the flow 37, the valve plate 321 being urged in a direction which normally blocks connection between flow path 41 and the flow path 37. As a result, although the flow from the flow path 40 side goes against the urging force of the valve plate 321 and can push the valve plate 321 upward to flow toward the fluid path 37, because the flow from the flow path 37 side urges the valve plate 321 further in the same direction, this flow is not transmitted to the flow path 40.

Figure 10:
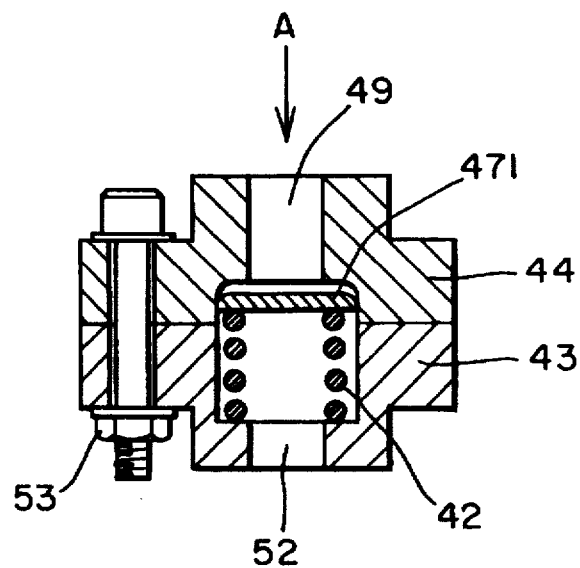
FIG. 10 is a partial cross-sectional view of the fluid controller utilizable in the fourth to seventh embodiments of the present invention.

FIG. 10 is a structure which further simplifies the fluid controller shown in FIG. 9. Reference numerals 43 and 44 are valve casings and reference numeral 53 indicates bolts and nuts for locking both the valve casings 43 and 44. A flow path 52 is formed in the valve casing 43 and a flow path 49 in the valve casing 44, both flow paths being opened or blocked by the valve plate 471 which is urged by a spring 42. As a result, although the flow from the flow path 49 side goes against the urging force of the valve plate 471 and can push the valve plate 471 upward to flow toward the flow path 52, because the flow from the flow path 52 side urges the valve plate 471 further in the same direction, this flow is not transmitted to the flow path 49.

Figure 11:
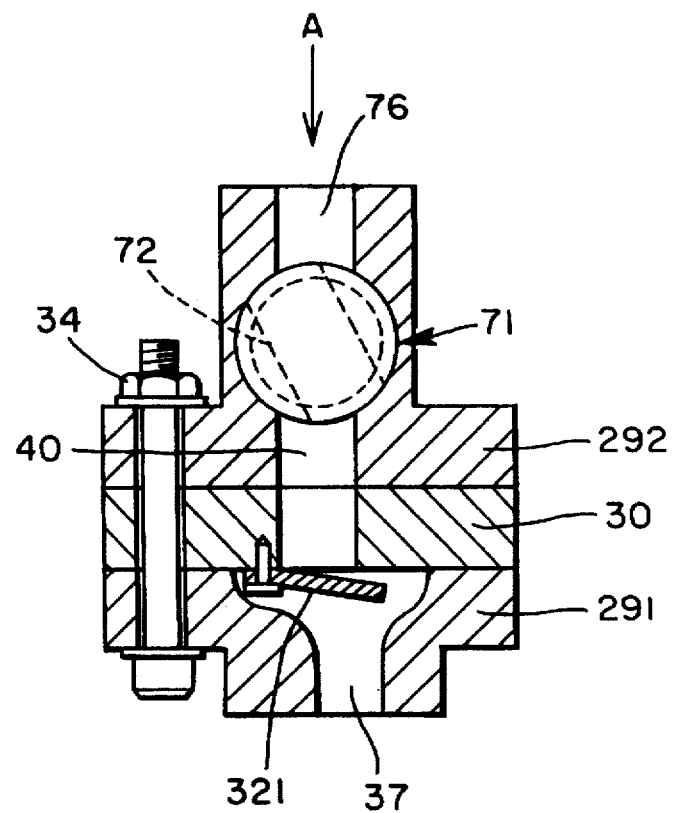
FIG. 11 is a partial cross-sectional view of the fluid controller utilizable in the fourth to seventh embodiments of the present invention.

FIG. 11 is a cross-sectional view of a flow rate adjusting cock 71 integrated with the one-way valve (fluid controller) in FIG. 9. Fluid from a fluid path 76 has its flow rate controlled by the cock 71, passes through the flow path 40, lifts the valve plate 321, and flows into the flow path 37. The cock 71 is the same as that shown in FIGS. 6(b), (c) and (d). In regulating the flow rate by means of this cock, the groove 73 shown in FIG. 6(b) can be rotated with a screwdriver or the like.

Here, in a regenerative type refrigerator, if the dead volume of fluid inside the system is not reduced, efficiency cannot be improved because the compression ratio of the fluid cannot be increased. For this reason, by integrating the one-way valve and the flow rate control cock as shown in FIG. 11 as well as making the flow path system and piping as small as possible, it is possible to improve efficiency.

The fluid controller shown in FIG. 9, FIG. 10 and FIG. 11 is shown in the examples applied to a pulse tube refrigerator in FIG. 12. In FIG. 12, the fluid controller shown in FIGS. 9 to 11 is connected to the fluid controller indicated by reference numeral 19. In this case, the connection is so made that the direction of flow indicated by the arrow A in FIGS. 9 to 11 coincides with the backward flow direction of the pulse tube refrigerator shown in FIG. 12 (flow toward the pulse tube 5 from a buffer tank 22, or flow toward the pulse tube 5 from the expansion space 16).

Figure 12A:
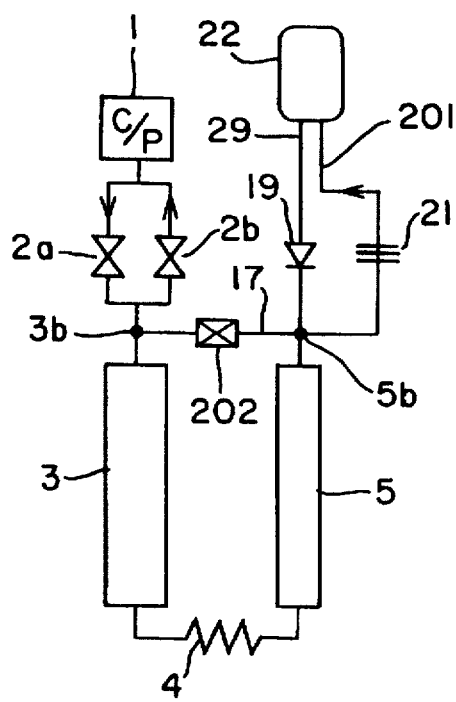
FIG. 12 shows the flow path system of a pulse tube type regenerative engine of the fourth to seventh embodiments of the present invention, (a) being the fourth embodiment, (b) being the fifth embodiment, (c) being the sixth embodiment and (d) being the seventh embodiment.

In the structure shown in FIG. 12(a), the fluid of approximately 20 atms generated by the compressor 1, upon the inlet valve 2a opening, flows through the regenerator 3, cold head 4, pulse tube 5 and high temperature end 5b of the pulse tube 5 from the high temperature end 3b of the regenerator 3, is heat-radiated by the second radiator 13, and enters the fluid tank 22. This fluid is, prior to this, mixed with part of the fluid which has entered the double inlet passage 17. When the inlet valve 2a closes and the discharge valve 2b opens, most of the fluid in the fluid tank 22 returns to the compressor through the fluid controller 19, pulse tube 5, cold head 4 and regenerator 3. Prior to this, part of the fluid is mixed with fluid which has returned from the high temperature end 5b of the pulse tube 5 by the second fluid controller 202, the high temperature end 3b of the regenerator 3 and the discharge valve 2b, the discharge valve 2b closes, and the cycle finishes. In an existing pulse tube refrigerator, since the fluid controller 19 is not added to the flow path system, the fluid normally returns from the second radiator 13 and there is loss due to the fluid resistance inside the second radiator 13, adjustment of the refrigeration generating rate is difficult due to phase displacement by changes in capacity with each cycle and efficiency is degraded. With respect to this, in the present embodiment, because it is possible to bypass the radiator(s) depending on the direction of flow of the fluid, efficiency is rapidly improved compared to the prior art.

[Fifth Embodiment]

Figure 12B:
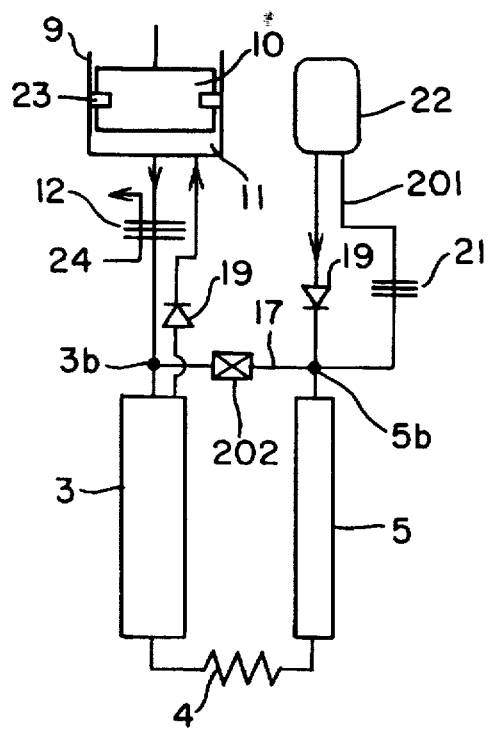

As the fifth embodiment, the fluid controller shown in FIGS. 9 to 11 is added to the pulse tube refrigerator shown in FIG. 12(b). Here, fluid controllers are indicated by the reference numerals 191 and 192. This is an application example which introduces fluid controllers 191 and 192 into a mechanical structure connecting, between a compression space 11 on which volume variation is performed by a piston 9 driven by an electromagnetic dielectric type or synchronous type linear engine and the fluid tank 22, a first radiator 12, regenerator 3, cold head 4, pulse tube 5 and second radiator 13. A compressed operating gas from the compression space 11 enters the regenerator 3 through the first radiator 12. Subsequently, it passes through the cold head 4 and pulse tube 5 and reaches the high temperature end 5b of the pulse tube 5. Here it is mixed with a gas from the double inlet passage 17 via the second fluid controller 202 and, through the second radiator 13, enters the expansion space defined by the expansion cylinder 14 and the expansion piston 15. On the other hand, the operating gas from the expansion space 16 enters the fluid controller 192, bypasses the second radiator 13, and enters the fluid controller 191 through the pulse tube 5, cold head 4 and regenerator 3. Then, it bypasses the radiator 12 and directly enters the compression space 11. Thereby, efficiency is improved by 15% or more.

[Sixth Embodiment]

Figure 12C:
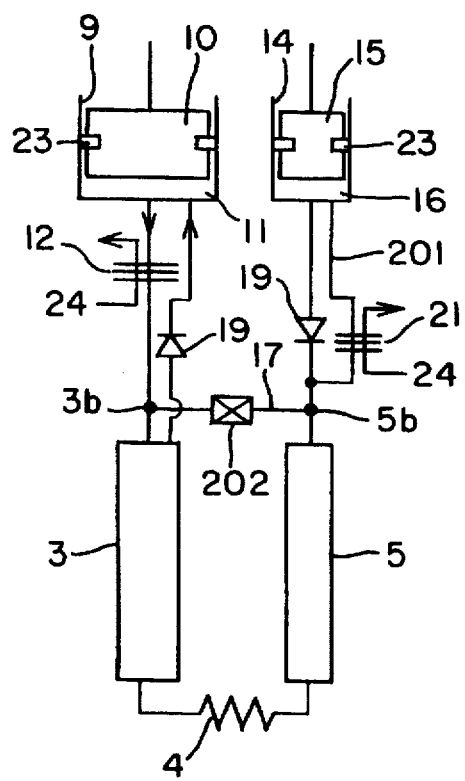

As the sixth embodiment, the fluid controller 19 shown in FIGS. 9 to 11 is added to the pulse tube refrigerator shown in FIG. 12(c). Since the flow of the operating gas in this example is substantially the same as that explained in the fifth embodiment, description thereof will be omitted here.

[Seventh Embodiment]

Figure 12D:
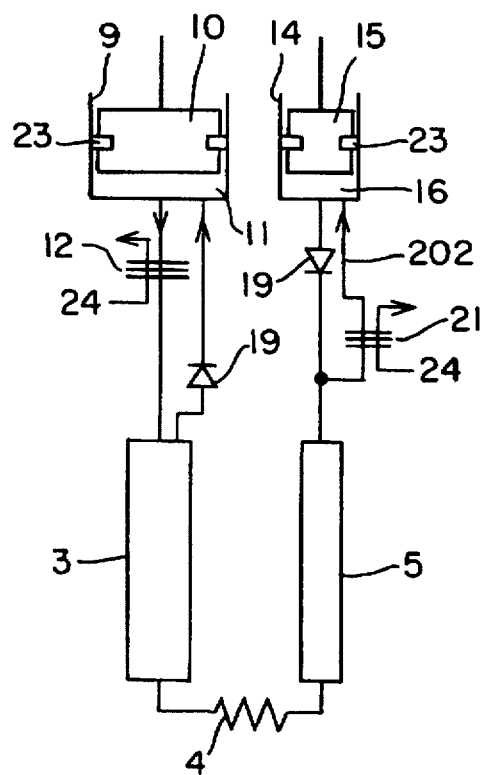

As the seventh embodiment, the fluid controllers 191 and.192 shown in FIGS. 9 to 11 have been added to the pulse tube refrigerator shown in FIG. 12(d). This replaces the compression piston 10 and compression cylinder 9 with the pressure fluctuation source formed by the compressor 1, inlet valve 2a and discharge valve 2b shown in 12(a), and replaces the expansion cylinder 14 and expansion piston 15 with the phase regulating mechanism formed by the fluid tank 22 shown in FIG. 12. The flow of the operation gas will not be described here as it is substantially the same as that illustrated in the fifth embodiment.

Figure 13:
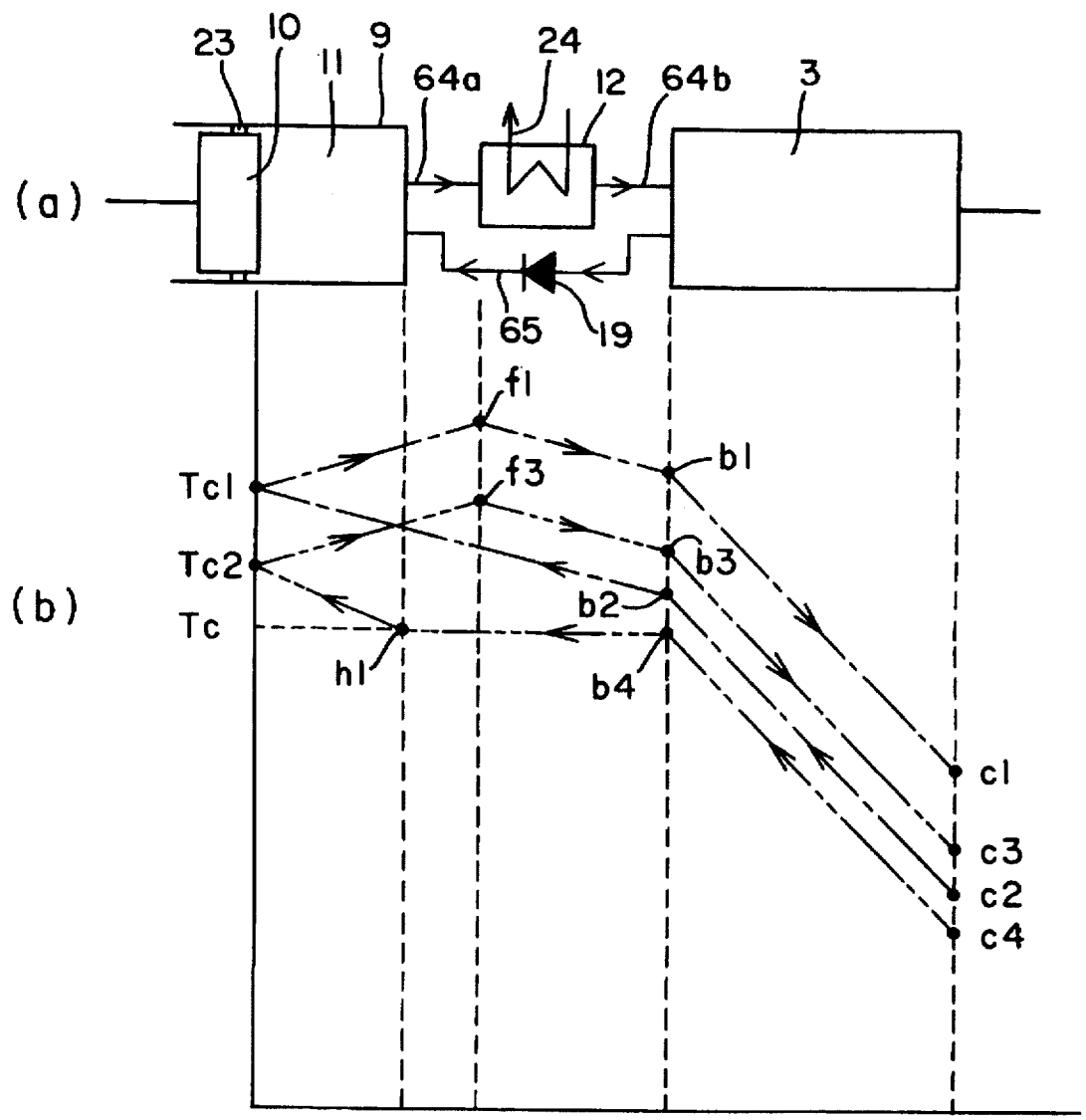
FIG. 13 is a graph showing the relationship between the position and temperature of an operating fluid within the regenerative type engine system of the present invention.
Figure 14:
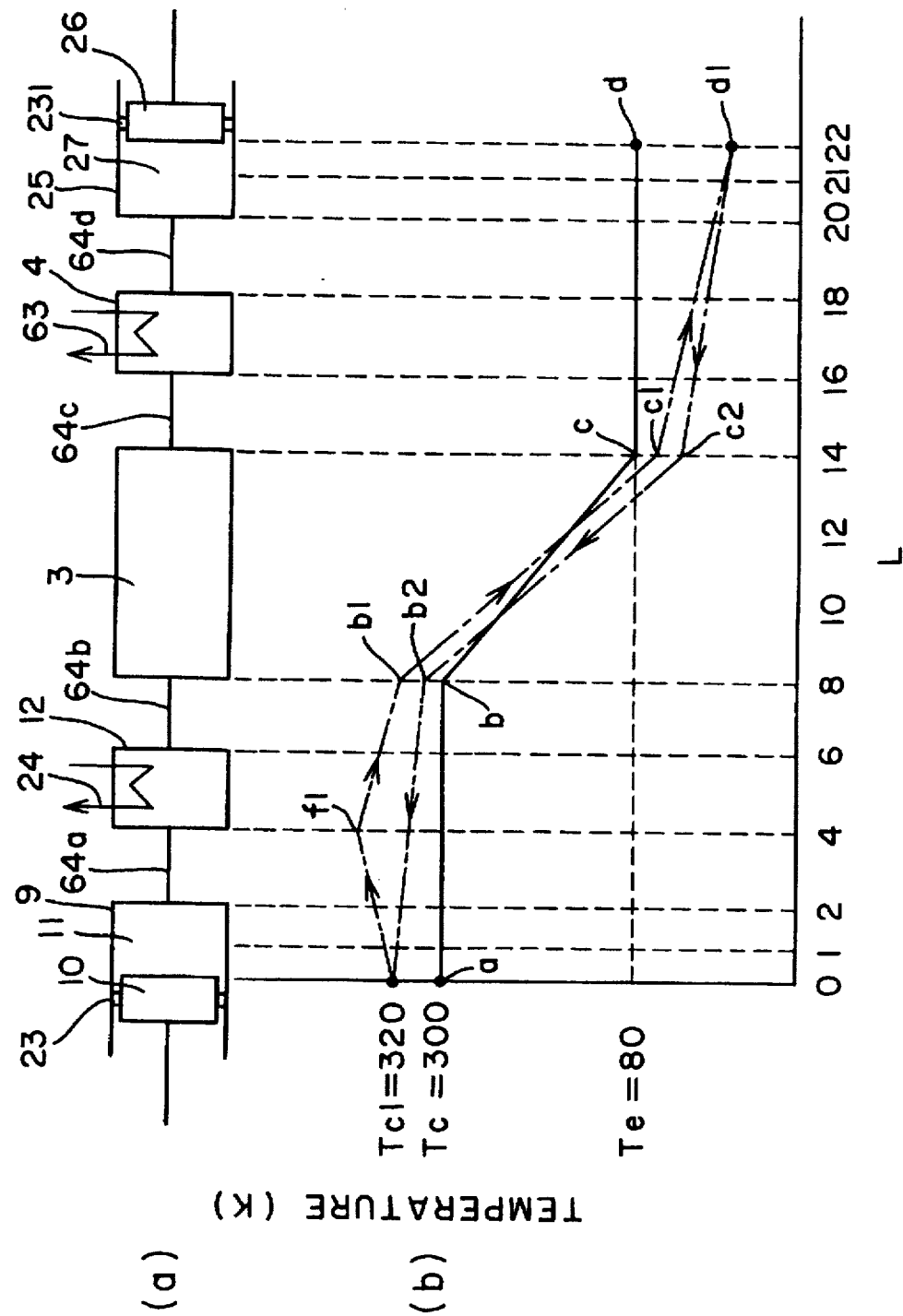
FIG. 14 is a graph showing the relationship between the position and temperature of an operating fluid within a conventional regenerative type engine system.

In the embodiment of the present invention described above, the relationship between the position of the operating gas and the temperature at that position will be explained based on FIG. 13. FIG. 13(a) shows the structure between the compression piston 10 and compression cylinder 9 and the regenerator 3, and FIG. 3(b) is a graph illustrating the relationship between the position of each component and the temperature of the operating gas at those positions. Although in the prior art the radiator 12 is used in the same manner as a regenerative heat exchanger, in which the fluid flows backward, this is excluded from the present invention, so that originally, in order to provide a radiator for radiating the heat of a high temperature, and high pressure fluid in one direction to cool the same, the backward-flowing fluid returning to the compression space 11 from the regenerator 3 is caused to return directly to the compression space 11 by bypassing the radiator 12 by way of piping 65 which interposes the fluid controller 19 formed by a one-way valve or the like. As a result, as shown by the double-dot broken line in FIG. 13(b), compression begins at Tc2 in the compression space 11, high-pressure, high-temperature fluid enters the radiator 12 from piping 64a at a temperature of f3 to be radiated, is cooled to b3, and then enters the regenerator 3. The fluid returning to the regenerator 3 when refrigeration is finished passes through the one-way valve 19 whose fluid resistance is minimal from the piping 65 at temperature b4, enters the compression space 11 at a substantially constant temperature of h1 to have its temperature increased, then the cycle is concluded at the temperature Tc2. Conversely to this, in the conventional refrigerator structure indicated by the single-dot broken line, it can be understood that the temperature until the compressed fluid enters the regenerator 3, or the temperature when the fluid on which refrigeration has been concluded enters the compression space 11 from the regenerator 3, is higher at those positions than in the present embodiment, and departs from the temperature Tc. Thereby, the high efficiency of the mechanical structure described in the present embodiment can be proven.

Note that, in the isochoric process in which the fluid returns to the compression space 11 from the regenerator 3, the pressure of the fluid in the regenerator 3 is higher than the pressure of the compression space 11. However, the volume of the fluid returning to the compression space from the piping 64a, radiator and piping 65 is minute and has no effect on performance. This is because the fluid resistance of the regenerator 12 is overwhelmingly larger than that of the piping 64a and the fluid controller 19, so that most of the fluid returns to the compression space at the temperature at which it exited the regenerator 3.

Also, the high-pressure, high-temperature fluid from the compression space absolutely does not flow from the piping 65 and fluid controller 19 into the regenerator 3. The fluid controller has a one-way valve function and therefore is of a structure which renders backward flow impossible.

The invention has the following effects. The flow rate and pressure of the operating fluid within the system of the regenerative type engine are individually controllable for the flows in each backward and forward path, and the regenerative engine can be operated under optimal operating conditions. As a result, an regenerative engine with good efficiency can be attained.

Since the flow paths of each of the forward flow path and the backward flow path of the operating fluid reciprocating within the system of the regenerative engine are constructed so as to be individually controllable, factors which prevent improvement of efficiency arising from the operating fluid following the same paths in the forward direction and the backward direction can be eliminated and therefore the efficiency of the regenerative type engine can be further improved.

The operating fluid reciprocating within the system of the regenerative engine passes through a first fluid passage of the flow path controller in the forward path and passes through a second fluid passage of the flow path controller in the backward path. By using this type of structure, flow path control of the operating fluid can be realized by a simple structure.

In the forward path of the operating fluid reciprocating within the system of the regenerative engine, the operating fluid bypasses the flow path controller and passes through the radiator. On the other hand, in the backward path it bypasses the radiator and passes through the second fluid passage of the flow path controller. Consequently, the structure of the flow path controller becomes extremely simple and the backward flow path does not pass through the flow path controller, therefore pressure loss is reduced even further and efficiency is improved.

In the operating fluid reciprocating within the system of the regenerative engine, the forward flow passes through the first fluid passage of the flow path controller and the backward flow passes through the second fluid passage of the flow path controller. At this time, by means of a flow rate controller provided in the midsection of at least one of the first fluid passage and the second fluid passage, the flow rate of the operating fluid passing through the passage system can be controlled. By integrating the flow path controller and the flow rate controller in this manner, control of the operating fluid can be effectively realized with an even simpler structure.

By integrating the flow path controller and the flow rate controller, control of the operating fluid can be effectively realized with an even simpler structure.

A valve mechanism comprising a valve plate urged in the backward flow direction of the operating fluid is disposed in the first passage, blocking the passing into the first passage of the operating fluid flowing in the backward path, and a valve mechanism comprising a valve plate urged in the forward flow direction of the operating fluid is disposed in the second passage, blocking the passing into the second passage of the operating fluid flowing in the forward path, by which structure regulation of the forward flow path can be realized by a simpler structure.

Since a valve mechanism comprising a valve plate urged in the forward flow direction of the operating fluid is disposed in the second passage, the flow path and flow rate of the operating fluid can be controlled by a simple structure.

The flow rate controller is constructed by a cock for controlling the flow rate of the operating fluid passing through a flow path in which the flow rate controller is interposed. As a result, a simple fluid controller which is inexpensive to assemble can be realized.

In a double inlet type pulse tube regenerative engine, at least one of the flow rate in the forward path and the flow rate in the backward path of the operating fluid reciprocating within a double inlet passage is independently controlled by a fluid rate controller. By using this type of structure, the advantages of providing the double inlet passage (optimization of operating conditions) can be maintained and the disadvantages of providing the double inlet passage (generation of a direct circulating flow which circulates through the regenerator, heat absorber, pulse tube and double inlet passage) can be reduced, whereby the efficiency of the regenerative type engine can be improved.

A flow path controller for independently controlling the forward path and backward path of the operating fluid reciprocating within the double inlet passage is provided. Thereby, this becomes a structure which can separately regulate the flow paths of the operating fluid in each of the forward path and backward path, and can improve even further the efficiency of the regenerative type engine.

The forward flow of the operating fluid passing through the double inlet system passes through a third fluid passage of the flow path controller, while the backward flow passes through a fourth fluid passage. Thereby, flow path control of the operating fluid within the double inlet passage can be realized by a simple structure.

The flow path controller is formed by a valve mechanism provided within each of the third passage and the fourth passage. Thereby, flow path control of the operating fluid within the double inlet passage can be realized by a simple structure.

The flow rate controller is formed by a cock provided in the midsection of the flow path of the operating fluid. Thereby, regulation of the flow rate and flow path can be achieved by a simple structure.

What is claimed is:

1. A regenerative type engine with fluid control mechanism, which regenerative type engine connects a pressure fluctuation source, a regenerator, a heat absorber and a phase regulating mechanism in series, and performs low temperature generation, or generates power by imparting a phase difference on reciprocation and pressure fluctuation of an operating fluid, comprising:
   a radiator arranged at a position at least between the pressure fluctuation source and the regenerator or between the heat absorber and the phase regulating mechanism; and a flow path controller connected to the radiator, for connecting a flow path in a forward process of an operating fluid within a regenerative type engine system to the radiator and regulating the flow path in the forward process and the flow path in the backward process so that the flow path in the backward process bypasses the radiator.

2. The regenerative type engine with fluid control mechanism of claim 1, wherein the flow path controller comprises a first fluid passage through which the operating fluid in a forward path passes and a second fluid passage through which the operating fluid in a backward path passes.

3. The regenerative type engine with fluid control mechanism of claim 1, wherein the flow path controller comprises a second fluid passage through which the operating fluid in a backward path passes, and the operating fluid in a forward path bypasses the flow path controller.

4. The regenerative type engine with fluid control mechanism of claim 2, wherein the regenerative type engine with fluid control mechanism comprises a flow rate controller, installed in at least one of the first fluid passage and the second fluid passage, for controlling the flow rate of the operating fluid passing through its interior.

5. The regenerative type engine with fluid control mechanism of claim 3, wherein the regenerative type engine with fluid control mechanism comprises a flow rate controller, installed in the second fluid passage, for controlling the flow rate of the operating fluid in the forward path.

6. The regenerative type engine with fluid control mechanism of claim 2, wherein:

in the first fluid passage, a valve mechanism having a valve plate which is urged in a backward direction of the operating fluid is provided, and passage of the operating fluid in the backward path to the first fluid passage is blocked by the valve mechanism in the first fluid passage; and in the second fluid passage, a valve mechanism having a valve plate which is urged in a forward direction of the operating fluid is provided, and passage of the operating fluid in the forward path to the second fluid passage is blocked by the valve mechanism in the second fluid passage.

7. The regenerative type engine with fluid control mechanism of claim 3, wherein the second fluid passage comprises a valve mechanism having a valve plate which is urged in a forward direction of the operating fluid, and passage of the operating fluid in the forward path to the second fluid passage is blocked by the valve mechanism in the second fluid passage.

8. The regenerative type engine with fluid control mechanism of claim 4, wherein the flow rate controller is formed by a cock which controls the flow rate of an operating fluid passing through a flow path in which the flow rate controller is installed.

9. A pulse tube regenerative type engine with fluid control mechanism, which pulse tube regenerative type engine connects a pressure fluctuation source, a regenerator, a heat absorber, pulse tube and a phase regulating mechanism in series, performs low temperature generation or power generation by imparting a phase different on reciprocation and pressure fluctuation of an operation fluid and comprises:

a double inlet passage for connecting a high temperature end of the regenerator and the high temperature end of the heat absorber; and a flow rate controller for independently controlling at least one of a flow rate in a forward path and a flow rate in a backward path of the operating fluid which reciprocates within the double inlet passage, the flow rate in the forward path being controlled independently of the flow rate in the backward path.

10. The pulse tube regenerative type engine with fluid control mechanism of claim 9, further comprising a flow path controller for controlling a forward path and backward path of the operating fluid which reciprocates within the double inlet passage.

11. The pulse tube regenerative type engine with fluid control mechanism of claim 10, wherein the flow path controller comprises a third passage through which the operating fluid in a forward process passes and a fourth passage through which the operating fluid in a backward process passes.

12. The pulse tube regenerative type engine with fluid control mechanism of claim 11, wherein:

in the third passage, a valve mechanism comprising a valve plate which is urged in a backward direction of the operating fluid is provided, and passage of the operating fluid in a backward path to the third passage is blocked by the valve mechanism in the third passage; and in the fourth passage, a valve mechanism comprising a valve plate which is urged in a forward direction of the operating fluid is provided, and passage of the operating fluid in a forward path to the fourth passage is blocked by the valve mechanism in the fourth passage.

13. The regenerative type engine with fluid control mechanism of claim 12, wherein the flow rate controller is formed by a cock which controls the flow rate of the operating fluid within a flow path in which the flow rate controller is installed.

14. The regenerative type engine with fluid control mechanism of claim 4, wherein:

in the first fluid passage, a valve mechanism having a valve plate which is urged in an backward direction of the operating fluid is provided, and passage of the operating fluid in the backward path to the first fluid passage is blocked by this valve mechanism; and in the second fluid passage, a valve mechanism having a valve plate which is urged in an forward direction of the operating fluid is provided, and passage of the operating fluid in the forward path to the second fluid passage is blocked by this valve mechanism.

15. The regenerative type engine with fluid control mechanism of claim 5, wherein the second fluid passage comprises a valve mechanism having a valve plate which is urged in an forward direction of the operating fluid, and passage of the operating fluid in the forward path to the second fluid passage is blocked by this valve mechanism.

16. The regenerative type engine with fluid control mechanism of claim 5, wherein the flow rate controller is formed by a cock which controls the flow rate of an operating fluid passing through a flow path in which the flow rate controller is installed.

17. The regenerative type engine with fluid control mechanism of claim 6, wherein the flow rate controller is formed by a cock which controls the flow rate of an operating fluid passing through a flow path in which the flow rate controller is installed.

18. The regenerative type engine with fluid control mechanism of claim 14, wherein the flow rate controller is formed by a cock which controls the flow rate of an operating fluid passing through a flow path in which the flow rate controller is installed.

* * * * *